US009402208B2

(12) United States Patent
Zhang et al.

(10) Patent No.: US 9,402,208 B2
(45) Date of Patent: Jul. 26, 2016

(54) HANDOVER METHOD AND BASE STATION

(71) Applicant: HUAWEI TECHNOLOGIES CO., LTD., Shenzhen (CN)

(72) Inventors: Liangliang Zhang, Beijing (CN); Junren Chang, Beijing (CN); Yajuan Li, Beijing (CN); Yongping Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 14/088,580

(22) Filed: Nov. 25, 2013

(65) Prior Publication Data
US 2014/0087731 A1 Mar. 27, 2014

Related U.S. Application Data

(63) Continuation of application No. PCT/CN2012/075269, filed on May 10, 2012.

(30) Foreign Application Priority Data

May 25, 2011 (CN) .......................... 2011 1 0136652

(51) Int. Cl.
H04W 36/00 (2009.01)
H04W 36/28 (2009.01)

(52) U.S. Cl.
CPC ...... *H04W 36/0005* (2013.01); *H04W 36/0055* (2013.01); *H04W 36/28* (2013.01)

(58) Field of Classification Search
CPC .............................. H04W 16/14; H04W 36/00
USPC .......................... 455/436; 370/331, 332, 334
See application file for complete search history.

(56) References Cited

U.S. PATENT DOCUMENTS 8,514,813 B2    8/2013 Zhang et al. ............... 370/331
8,724,590 B2 *  5/2014 Bi et al. ...................... 370/331
(Continued)

FOREIGN PATENT DOCUMENTS

CN    101453765 A    6/2009
CN    101635962 A    1/2010
(Continued)

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", *3GPP TS 36.300 V8.7.0* (Dec. 2008) *Technical Specification*, 2008, pp. 1-144, 3GPP Organizational Partners, Valbonne, France.

Can, Dong, Wu Dongwei, Xian Yongju, and Zhang Zufan, "Handoff Procedure Analysis of LTE-A System with Multi-carriers Aggregation", *Telecommunications Science*, Sep. 28, 2009, pp. 46-50, Issue 12, China Academic Journal Electronic Publishing House.

(Continued)

*Primary Examiner* — Amancio Gonzalez
(74) *Attorney, Agent, or Firm* — Staas & Halsey LLP

(57) ABSTRACT

A handover method and a base station are provided. The handover method may include: when a UE needs to be handed over, obtaining bearer context information of the UE in a first base station; sending a handover request to a target base station, where the handover request carries the bearer context information; and after receiving a handover response that is returned by the target base station and indicates that the handover is agreed to, sending a handover command to the UE so that the UE is handed over to the target base station. Based on the above technical solutions, the UE handover can be implemented quickly in the case of using multiple carriers and the current service of the UE can be recovered quickly, which can improve communication experience of a user.

20 Claims, 18 Drawing Sheets

(56) References Cited

U.S. PATENT DOCUMENTS 8,885,597 B2 * 11/2014 Koyanagi et al. ............. 370/331
2010/0322197 A1    12/2010 Adjakple et al.
2011/0200014 A1 *   8/2011 Lee ................... H04W 36/0083
                                                    370/332

FOREIGN PATENT DOCUMENTS

EP    2 190 241 A1   5/2010
EP    2306772        4/2011

OTHER PUBLICATIONS

International Search Report issued Aug. 16, 2012, in corresponding International Patent Application No. PCT/CN2012/075269.
Extended European Search Report, dated Jun. 5, 2014, in corresponding European Application No. 12790288.0 (10 pp.).
International Search Report mailed Aug. 16, 2012, in corresponding International Application No. PCT/CN2012/075269.

* cited by examiner

US 9,402,208 B2

HANDOVER METHOD AND BASE STATION

CROSS-REFERENCE TO RELATED APPLICATION

This application is a continuation of International Application No. PCT/CN2012/075269, filed on May 10, 2012, which claims priority to Chinese Patent Application No. 201110136652.4, filed on May 25, 2011, both of which are hereby incorporated by reference in their entireties.

TECHNICAL FIELD

The present invention relates to the wireless communication field, and in particular, to a handover method and a base station in the wireless communication field.

BACKGROUND

At present, a 3GPP LTE-A system has agreed to use a carrier aggregation technology as a method for extending a system bandwidth, so as to support a peak data rate of up to 1 Gbps. The main idea of carrier aggregation is to aggregate multiple component carriers into a large-bandwidth carrier so as to support a high data rate.

A user equipment (User Equipment, UE) may aggregate carriers from two different stations, so as to implement carrier aggregation between different stations. For example, when a UE is located at a cell edge, the UE may aggregate low-band carriers from a macro base station and high-band carriers from a relay station (Relay Node, RN).

When the UE uses carriers from different stations, the UE and a radio network may maintain a radio resource control (RRC) connection therebetween, or may maintain multiple radio resource connections therebetween. As described in the above example, the UE is served by the macro base station and the RN, and has established a data connection with both the macro base station and the RN, but the UE may maintain an RRC connection with only one of the macro base station and the RN, or may maintain two RRC connections with both the macro base station and the RN.

In the case of carrier aggregation between different stations, if a UE that is using the carrier aggregation technology or is ready to use the carrier aggregation technology needs to be handed over, there is no related technical solution that can solve the problem about how to hand over the UE. That is, firstly, when the UE is served by multiple stations based on the carrier aggregation technology, if the UE needs to be handed over, the UE cannot be handed over quickly and the current service of the UE cannot be recovered quickly according to the related technology; secondly, no matter whether the UE is using the carrier aggregation technology, if the UE expects to use the carrier aggregation technology after the handover, the UE cannot be directly handed over to two stations and the current service of the UE cannot be recovered quickly according to the related technology.

Therefore, before or after a UE handover, if the UE needs to use the carrier aggregation technology, how to quickly hand over the UE and quickly recover the current service of the UE for improving user experience is a problem that needs to be solved urgently.

SUMMARY

Embodiments of the present invention provide a handover method and a base station, which can solve the handover problem when a UE is using a carrier aggregation technology, so that a quick handover can be provided for the UE that is using the carrier aggregation technology or the UE that uses the carrier aggregation technology after the handover; in addition, a service before a UE handover can be recovered quickly for the UE, thereby improving communication experience of a user.

In one aspect, an embodiment of the present invention provides a handover method, including: when a user equipment UE needs to be handed over, obtaining bearer context information of the UE in a first base station, where the first base station is a source base station for the UE; sending a handover request to a target base station, where the handover request carries the bearer context information, where the bearer context information is used for the target base station to determine whether to accept a UE handover; and after receiving a handover response that is returned by the target base station and indicates that the handover is agreed to, sending a handover command to the UE, so as to instruct the UE to perform handover to the target base station.

In another aspect, an embodiment of the present invention provides a handover method, including: when a user equipment UE needs to be handed over, sending a handover request to a target base station; after receiving a handover response that is returned by the target base station and indicates that the handover is agreed to, sending a handover indication to a first base station serving the UE, so as to instruct the first base station to forward data to the target base station; and sending a handover command to the UE, so as to instruct the UE to perform handover to the target base station.

In another aspect, an embodiment of the present invention provides a handover method, including: when a user equipment UE needs to be handed over, sending a handover request to a first base station serving the UE, so that the first base station adds bearer context information of the UE in the first base station to the handover request and forwards the handover request to a target base station, where the bearer context information is used for the target base station to determine whether to accept a UE handover; and after receiving a handover response indicating that the handover is agreed to, which is forwarded by the first base station and returned by the target base station, sending a handover command to the UE, so as to instruct the UE to perform handover to the target base station.

In another aspect, an embodiment of the present invention provides a handover method, including: receiving a handover request sent by a first base station for a user equipment UE that needs to be handed over; adding bearer context information of the UE in a second base station to the received handover request, and sending the handover request to a target base station, where the bearer context information is used for the target base station to determine whether to accept a UE handover; and sending, to the first base station, a handover response that is returned by the target base station and indicates that the handover is agreed to, so as to instruct the first base station to send a handover command to the UE based on the handover response, where the handover command is used to instruct the UE to perform handover to the target base station.

In another aspect, an embodiment of the present invention provides a handover method, including: when a user equipment UE needs to be handed over, sending a handover request to a first target base station and a second target base station, where the handover request carries bearer context information of the UE and a base station identifier of the first target base station and a base station identifier of the second target base station, so that the first target base station determines, by negotiation with the second target base station based on the base station identifier of the second target base station, bearers that are related to the bearer context information and need to be undertaken respectively by the first target base station and the second target base station, where the bearer context information is used for the first target base station and the second target base station to determine whether to accept a UE handover; and after receiving handover responses indicating that the handover is agreed to, which are returned by the first target base station and the second target base station, sending a handover command to the UE, so as to instruct the UE to perform handover to the first target base station and the second target base station.

In another aspect, an embodiment of the present invention provides a handover method, including: receiving a handover request sent by a source base station for a user equipment UE that needs to be handed over, where the handover request carries bearer context information of the UE and a base station identifier of a first target base station; determining, by negotiation with the first target base station based on the base station identifier of the first target base station, bearers that are related to the bearer context information and need to be undertaken respectively; and when the negotiation succeeds, returning a handover response to the source base station to indicate that the handover is agreed to.

In another aspect, an embodiment of the present invention provides a handover method, including: if a user equipment UE has established an RRC connection with a first base station and a second base station respectively, when the UE needs to be handed over from the second base station to a target base station, sending a handover request to the target base station, where the handover request carries a base station identifier of the first base station, so that the target base station performs interaction with the first base station based on the base station identifier of the first base station; and after receiving a handover response that is returned by the target base station and indicates that the handover is agreed to, sending a handover command to the UE, so as to instruct the UE to perform handover to the target base station.

In another aspect, an embodiment of the present invention provides a handover method, including: if a user equipment UE has established an RRC connection with a first base station and a second base station respectively, when the UE needs to be handed over from the second base station to a target base station, receiving a handover request sent by the second base station, where the handover request carries a base station identifier of the first base station; performing interaction with the first base station based on the base station identifier; and when determining, based on the handover request, to agree to the handover, completing a UE handover with the second base station.

In another aspect, an embodiment of the present invention provides a base station, including: an obtaining module, configured to: when a user equipment UE needs to be handed over, obtain bearer context information of the UE in a first base station, where the first base station is a source base station for the UE; a first sending module, configured to send a handover request to a target base station, where the handover request carries the bearer context information, where the bearer context information is used for the target base station to determine whether to accept a UE handover; and a second sending module, configured to: after a handover response that is returned by the target base station and indicates that the handover is agreed to is received, send a handover command to the UE, so as to instruct the UE to perform handover to the target base station.

In another aspect, an embodiment of the present invention provides a base station, including: a first sending module, configured to: when a user equipment UE needs to be handed over, send a handover request to a target base station; a second sending module, configured to: after a handover response that is returned by the target base station and indicates that the handover is agreed to is received, send a handover indication to a first base station serving the UE, so as to instruct the first base station to forward data to the target base station; and a third sending module, configured to send a handover command to the UE, so as to instruct the UE to perform handover to the target base station.

In another aspect, an embodiment of the present invention provides a base station, including: a sending module, configured to: when a user equipment UE needs to be handed over, send a handover request to a first base station serving the UE, so that the first base station adds bearer context information of the UE in the first base station to the handover request and forwards the handover request to a target base station, where the bearer context information is used for the target base station to determine whether to accept a UE handover; and a receiving module, configured to: after receiving a handover response indicating that the handover is agreed to, which is forwarded by the first base station and returned by the target base station, send a handover command to the UE, so as to instruct the UE to perform handover to the target base station.

In another aspect, an embodiment of the present invention provides a base station, including: a receiving module, configured to receive a handover request sent by a first base station for a user equipment UE that needs to be handed over; an adding module, configured to add bearer context information of the UE in the base station to the received handover request, and send the handover request to a target base station, where the bearer context information is used for the target base station to determine whether to accept a UE handover; and a sending module, configured to send, to the first base station, a handover response that is returned by the target base station and indicates that the handover is agreed to, so as to instruct the first base station to send a handover command to the UE based on the handover response, where the handover command is used to instruct the UE to perform handover to the target base station.

In another aspect, an embodiment of the present invention provides a base station, including: a first sending module, configured to: when a user equipment UE needs to be handed over, send a handover request to a first target base station and a second target base station, where the handover request carries bearer context information of the UE and a base station identifier of the first target base station and a base station identifier of the second target base station, so that the first target base station determines, by negotiation with the second target base station based on the base station identifier of the second target base station, bearers that are related to the bearer context information and need to be undertaken respectively by the first target base station and the second target base station, where the bearer context information is used for the first target base station and the second target base station to determine whether to accept a UE handover; and a second sending module, configured to: after handover responses indicating that the handover is agreed to are received, which are returned by the first target base station and the second target base station, send a handover command to the UE, so as to instruct the UE to perform handover to the first target base station and the second target base station.

In another aspect, an embodiment of the present invention provides a base station, including: a receiving module, configured to receive a handover request sent by a source base station for a user equipment UE that needs to be handed over, where the handover request carries bearer context information of the UE and a base station identifier of a first target base station; a first determining module, configured to determine, by negotiation with the first target base station based on the base station identifier of the first target base station, bearers that are related to the bearer context information and need to be undertaken respectively by the base station and the first target base station; and a sending module, configured to: when the negotiation succeeds, return a handover response to the source base station to indicate that the handover is agreed to.

In another aspect, an embodiment of the present invention provides a base station, including: a first sending module, configured to: if a user equipment UE has established an RRC connection with a first base station and a second base station respectively, when the UE needs to be handed over from the second base station to a target base station, send a handover request to the target base station, where the handover request carries a base station identifier of the first base station, so that the target base station performs interaction with the first base station based on the base station identifier of the first base station; and a second sending module, configured to: after a handover response that is returned by the target base station and indicates that the handover is agreed to is received, send a handover command to the UE, so as to instruct the UE to perform handover to the target base station.

In another aspect, an embodiment of the present invention provides a base station, including: a receiving module, configured to: if a user equipment UE has established an RRC connection with a first base station and a second base station respectively, when the UE needs to be handed over from the second base station to a target base station, receive a handover request sent by the second base station, where the handover request carries a base station identifier of the first base station; an interacting module, configured to perform interaction with the first base station based on the base station identifier; and a handover module, configured to: when determining, based on the handover request, to agree to the handover, complete a UE handover with the second base station.

Based on the above technical solutions, when a UE uses carrier aggregation before a handover and therefore has established a data connection with both a first base station and a second base station, the second base station performing the handover obtains bearer context information of the UE in the first base station and/or sends a handover indication to the first base station that fails to know the UE handover, so that the first base station forwards data; in this way, in different scenarios, the UE can be handed over to a target base station and the current service of the UE can be recovered quickly. In this way, the UE using multiple carriers can be handed over quickly, which can improve communication experience of a user in the handover process.

When the UE needs to be handed over to two target base stations so that the UE can use carrier aggregation after the handover, base station identifiers of both of the target base stations are carried in a handover request, so that the target base stations can determine, by negotiation with each other based on the base station identifiers, allocation of UE bearers. In this way, the UE can be smoothly handed over to the two target base stations, thereby implementing carrier aggregation after the handover, and the current service of the UE can be recovered quickly. In this way, even if the UE needs to use carrier aggregation, a quick handover may be performed, thereby improving communication experience of the user.

In addition, when one RRC connection of a UE having two RRC connections needs to be handed over, a base station identifier of a source base station that keeps the RRC connection unchanged is carried in a handover request, so that a target base station can quickly discover the source base station and interact with the source base station. In this way, the source base station and the target base station can cooperate better to serve the UE, and the impact caused by the handover to the communication experience of the user is reduced.

BRIEF DESCRIPTION OF DRAWINGS

To illustrate the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Firstly, a handover method 100 in an embodiment of the present invention is described with reference to FIG. 1.

Figure 1:
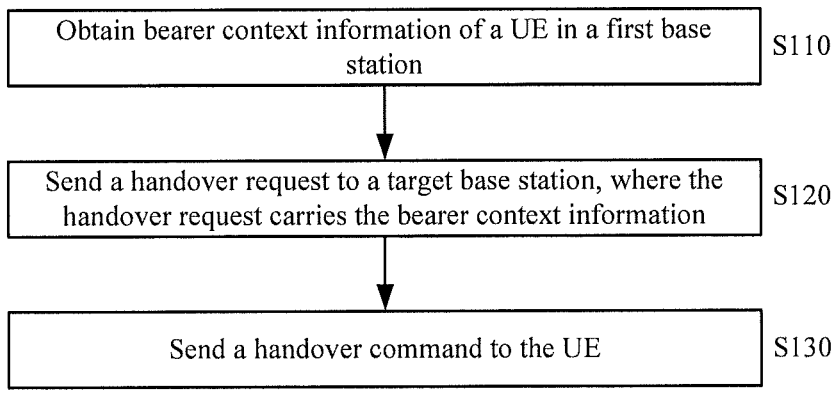
FIG. 1 is a flowchart of a handover method according to an embodiment of the present invention.

As shown in FIG. 1, the method 100 includes: in S110, when a UE needs to be handed over, obtaining bearer context information of the UE in a first base station, where the first base station is a source base station for the UE; in S120, sending a handover request to a target base station, where the handover request carries the bearer context information, where the bearer context information is used for the target base station to determine whether to accept a UE handover; and in S130, after receiving a handover response that is returned by the target base station and indicates that the handover is agreed to, sending a handover command to the UE, so as to instruct the UE to perform handover to the target base station.

The method 100 may be executed by a second base station. The first base station and the second base station are source base stations serving the UE before the handover. The UE and the second base station have established an RRC connection. An RRC connection may exist or not exist between the UE and the first base station. The second base station executes the UE handover. Because the second base station does not know the bearer context information of the UE in the first base station, the second base station needs to obtain the context information, and send a handover request to the target base station afterward. In this way, the target base station can know all bearer context information of the UE in the first base station and the second base station, and therefore determine, based on the bearer context information and so on, whether to accept the UE handover. If the target base station agrees to accept the UE handover, the target base station returns a handover response to the second base station indicating that the handover is agreed to, so that the UE can be handed over to the target base station. After the target base station agrees to accept the UE handover, the target base station may provide services for bearers of the UE, or may provide services for a part of bearers of the UE and allocate another part of the bearers to, for example, an RN of the target base station for providing corresponding services.

In S110, because the second base station does not know the bearer context information of the UE in the first base station, the second base station needs to obtain the bearer context information of the UE in the first base station from the first base station. The bearer context information is a terminal bearer list, and specifically includes bearer identifiers (E-RAB IDs), QoS parameters (E-RAB Level QoS Parameters) corresponding to bearers, uplink or downlink GTP tunnel endpoint addresses (UL/DL GTP Tunnel Endpoint), and so on.

According to an embodiment of the present invention, the second base station may receive the bearer context information sent when the first base station updates the bearer context information of the UE in the first base station.

When the first base station updates the bearer context information of the UE in the first base station, the first base station may actively send the updated bearer context information to the second base station. The first base station may update the bearer context information of the UE periodically, or update the bearer context information of the UE through event triggering, and so on.

According to an embodiment of the present invention, the second base station may request the bearer context information of the UE in the first base station from the first base station, and receive the bearer context information returned by the first base station.

The second base station may request the bearer context information of the UE in the first base station, so as to obtain the bearer context information.

According to an embodiment of the present invention, the second base station may receive the bearer context information that is sent by the first base station and triggered based on a result in a measurement report.

When the UE has established an RRC connection with the first base station, the first base station may also receive a measurement report sent by the UE. According to the result in the measurement report, the first base station may actively send the bearer context information of the UE in the first base station to the second base station. For example, when a specific parameter in the measurement report is lower than a threshold, the first base station sends bearer context information to the second base station.

By obtaining the bearer context information of the UE from the first base station, the second base station can know all bearer context information of the UE in the first base station and the second base station.

In S120, because the second base station executes the UE handover, the handover request needs to carry the bearer context information of the UE in the second base station as described in the related technology. In addition, the handover request further needs to carry the bearer context information of the UE in the first base station, where the bearer context information is obtained in S110. In this way, the target base station can obtain all bearer context information of the UE, and use, when determining whether to accept the UE handover, all the bearer context information of the UE carried in the handover request.

In S130, if the target base station accepts the UE handover, the target base station returns a handover response to the second base station indicating that the handover is agreed to. The second base station commands, based on the response, the UE to perform the handover.

According to the handover method provided by the embodiment of the present invention, when a UE uses carrier aggregation before a handover, a second base station obtains bearer context information of the UE in a first base station, so that a target base station can determine, based on all bearers in the first base station and the second base station, whether to agree to the handover. In this way, if the target base station agrees to the handover, the UE can be handed over from the first base station and the second base station to the target base station. In this way, the UE handover can be implemented quickly in the case of using multiple carriers, and the current service of the UE can be recovered quickly, which can improve communication experience of a user in the handover process.

Figure 2:
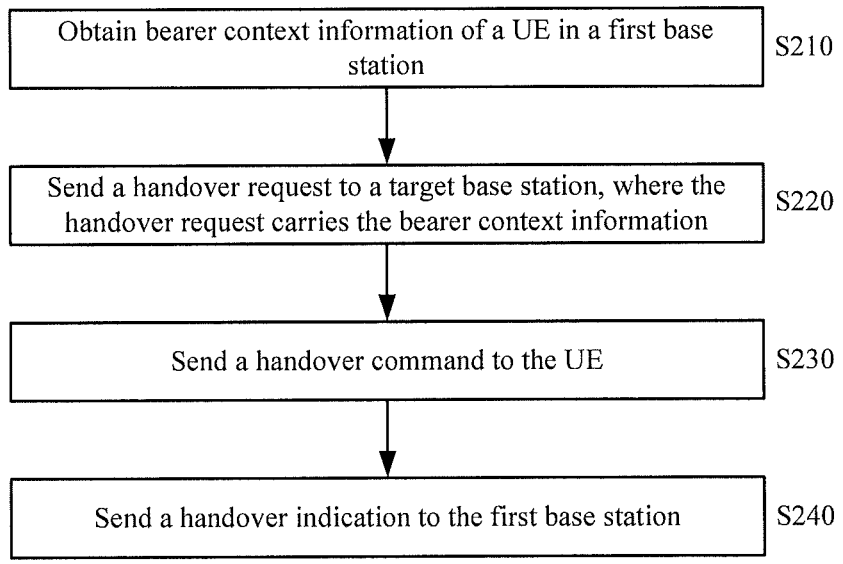
FIG. 2 is a flowchart of another handover method according to an embodiment of the present invention.

FIG. 2 is a flowchart of a handover method 200 according to an embodiment of the present invention. S210 to S230 in the method 200 are basically the same as S110 to S130 in the method 100.

In S240, a handover indication is sent to the first base station to instruct the first base station to forward data to the target base station.

After the second base station performing a handover receives a handover response indicating that the handover is agreed to, the second base station may send a handover indication to the first base station, where the handover indication is used to command the first base station to forward the data on the bearers of the UE to the target base station. In this way, after the UE is handed over to the target base station, the current service of the UE can be recovered quickly.

Although in FIG. 2, sending of a handover indication in S240 is executed after sending of a handover command in S230, sending of a handover indication in S240 may also be executed before or concurrently with sending of a handover command in S230, and the execution sequence does not limit the protection scope of the present invention.

According to an embodiment of the present invention, if the first base station has established an RRC connection with the UE, the handover request may carry the base station identifier of the first base station to indicate to the target base station that the first base station has established an RRC connection with the UE.

Because the source base station executing the UE handover is a second base station, an RRC connection exists between the second base station and the UE. If an RRC connection also exists between the first base station and the UE, the handover request carries the base station identifier of the first base station. In this way, the base station identifier of the first base station may be notified to the target base station, so that the target base station can know that the UE not only is using the carrier aggregation technology but also has multiple RRC connections, and if necessary, can perform interaction with the first base station by using the base station identifier of the first base station.

According to an embodiment of the present invention, after the UE is handed over to the target base station, the target base station indicates, based on the base station identifier of the first base station, to the first base station that the terminal handover succeeds, and instructs the first base station to release related resources of the UE.

Because the target base station knows existence of the first base station through the handover request, if the UE is handed over to the target base station and disconnected from the first base station, the target base station may, based on the base station identifier of the first base station, notify the first base station that the terminal handover succeeds, and notify the first base station of releasing related resources of the UE, that is, releasing related resources of the UE according to the context information of the UE. The context information of the UE includes bearer information, or terminal security information (such as terminal security capabilities [UE Security Capabilities] and a security key [Security Key]), or a terminal aggregate maximum bit rate UE Aggregate Maximum Bit Rate, or a related ID of the terminal on an X2 interface (for example, an Old eNB UE X2AP ID), or related IDs of the terminal on an S1 interface (for example, MME UE S1AP ID and eNB UE S1AP ID), and so on.

According to an embodiment of the present invention, after the UE is handed over to the target base station, the UE indicates to the first base station that the terminal handover succeeds, and instructs the first base station to release related resources of the UE.

After the UE is handed over to the target base station, the UE itself may notify the source base station before the handover, of releasing context information of the UE, that is, releasing related resources of the UE according to the context information of the UE (radio or control plane resources).

In addition, the target base station in S220 may be one or more target base stations.

According to an embodiment of the present invention, the target base station may include a first base station and a second target base station. In this case, the handover request in S220 carries a base station identifier of the first target base station and a base station identifier of the second target base station.

In this case, when the first target base station receives the handover request, the first target base station determines, by negotiation with the second target base station based on the base station identifier of the second target base station, bearers of the UE to be undertaken respectively by the first target base station and the second target base station.

Because the UE needs to be handed over to the first target base station and the second target base station, the second base station may send a handover request to the first target base station and the second target base station respectively, and carry the base station identifiers of the first target base station and the second target base station in the handover request. In this way, the two target base stations may know existence of each other, and know that the UE needs to be handed over to the first target base station and the second target base station.

After receiving the handover request, the first target base station determines, by negotiation with the second target base station, how to allocate the bearers of the UE which are reflected by the bearer context information of the UE carried in the handover request, to the two target base stations. If the bearers of the UE can be accepted by the first target base station and the second target base station, the UE can be handed over to the first target base station and the second target base station. If the negotiation between the two target base stations is inconsistent, and the bearers of the UE cannot be accepted completely, the UE cannot be handed over to the first target base station and the second target base station.

According to an embodiment of the present invention, the first target base station may determine a master station by negotiation with the second target base station based on the base station identifier of the second target base station.

The master station may be determined by negotiation between the first target base station and the second target base station in multiple modes.

For example, the first target base station may determine the master station according to the sequence of receiving the handover request by the first target base station and the second target base station. For example, if the first target base station is a macro base station and the second target base station is a relay station, the macro base station first receives the handover request, and in this case, the macro base station is the master station. The second target base station may also send time of receiving the handover request to the first target base station, and then the first target base station compares the time with its own receiving time, and determines the target base station that receives the handover request first as the master station.

For another example, the first target base station may determine the master station according to a predetermined configuration. For example, a target base station of a particular type or configuration may always be used as the master station, for example, if the first target base station and the second target base station are a macro base station and an RN respectively, the macro base station is used as the master station.

For another example, the first target base station may determine the master station according to the sequence of establishing an RRC connection with the UE by the first target base station and the second target base station.

For another example, the first target base station may determine the master station according to the sequence of carrying the base station identifier of the first target base station and the base station identifier of the second target base station by the handover request. For example, if the base station identifier of the first target base station carried in the handover request is located before the base station identifier of the second target base station, it is determined that the first target base station is the master station.

For another example, the first target base station may determine the master station according to a response message returned by the second target base station in response to a request message sent by the first target base station for requesting to determine the master station. For example, the first target base station sends a request message to the second target base station, where the request message carries the base station identifier of the first target base station to suggest determining the first target base station as the master station. If a response message returned by the second target base station indicates that the suggestion is agreed to, the first target base station is the master station; otherwise, the second target base station is the master station.

According to the handover method provided by the embodiment of the present invention, if the first base station also has an RRC connection, the handover request carries the base station identifier of the first base station. In this way, the target base station can perform interaction with the first base station based on the base station identifier, and notify the first base station that the terminal handover succeeds, and notify the first base station of releasing related resources of the UE. If the UE is handed over to multiple target base stations, base station identifiers of the multiple target base stations are carried so that the target base stations may determine by negotiation the master station or a station for managing bearers, thereby helping to smoothly perform a handover in the scenario.

Figure 3:
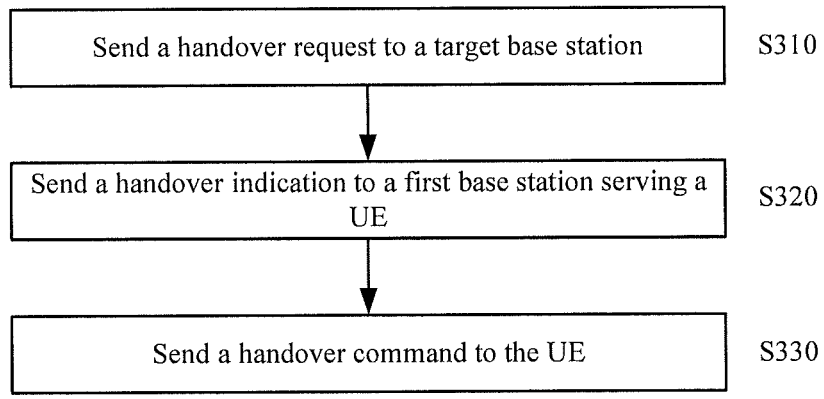
FIG. 3 is a flowchart of another handover method according to an embodiment of the present invention.

FIG. 3 is a flowchart of a handover method 300 according to an embodiment of the present invention.

As shown in FIG. 3, the method 300 includes: in S310, when a UE needs to be handed over, sending a handover request to a target base station; in S320, after receiving a handover response that is returned by the target base station and indicates that the handover is agreed to, sending a handover indication to a first base station serving the UE, so as to instruct the first base station to forward data to the target base station; and in S330, sending a handover command to the UE, so as to instruct the UE to perform handover to the target base station.

For example, the method 300 may be executed by a second base station. The second base station and the first base station are source base stations for the UE. The second base station executing the UE handover has established an RRC connection with the UE, and an RRC connection may exist or not exist between the first base station and the UE. During the handover, because the first base station does not know that the UE needs to be handed over, the second base station sends a handover indication to the first base station to instruct the first base station to forward UE data (for example, downlink data not successfully sent to the UE or uplink data not sent to a gateway) to the target base station. In this way, the current service of the UE can be recovered quickly after the handover, and the communication experience of a user can be improved.

According to the embodiment of the present invention, if the first base station has established an RRC connection with the UE, the handover request sent by the second base station may carry the base station identifier of the first base station to indicate to the target base station that the first base station has established an RRC connection with the UE. In this way, after the UE is handed over to the target base station, the target base station may send a UE context release message to the UE based on the base station identifier of the first base station, so as to indicate to the first base station that the terminal handover succeeds, and instruct the first base station to release related resources of the UE.

Releasing is performed according to the indication of the target base station. In addition, according to an embodiment of the present invention, after the UE is handed over to the target base station, the UE may indicate to the first base station that the terminal handover succeeds, and instruct the first base station to release related resources of the UE.

According to the embodiment of the present invention, the target base station may include a first target base station and a second target base station; in this case, the handover request carries a base station identifier of the first target base station and a base station identifier of the second target base station.

In this case, when the first target base station receives the handover request, the first target base station determines, by negotiation with the second target base station based on the base station identifier of the second target base station, bearers of the UE to be undertaken respectively by the first target base station and the second target base station.

In addition, the first target base station may determine a master station by negotiation with the second target base station based on the base station identifier of the second target base station. For example, the first target base station may determine the master station according to the sequence of receiving the handover request by the first target base station and the second target base station, or according to a predetermined configuration, or according to the sequence of establishing an RRC connection with the UE by the first target base station and the second target base station, or according to the sequence of carrying the base station identifier of the first target base station and the base station identifier of the second target base station by the handover request, or according to a response message returned by the second target base station in response to a request message sent by the first target base station for requesting to determine the master station. Definitely, persons skilled in the art may think of other modes for determining the master station.

According to the handover method provided by the embodiment of the present invention, a handover indication is sent to the first base station, so that the first base station may forward data. In this way, the UE handover can be implemented quickly in the case of using multiple carriers, which can improve communication experience of a user in the handover process.

The following describes a message exchange diagram of an example of handing over a UE by using a handover method according to an embodiment of the present invention with reference to FIG. 4 to FIG. 7.

Figure 4:
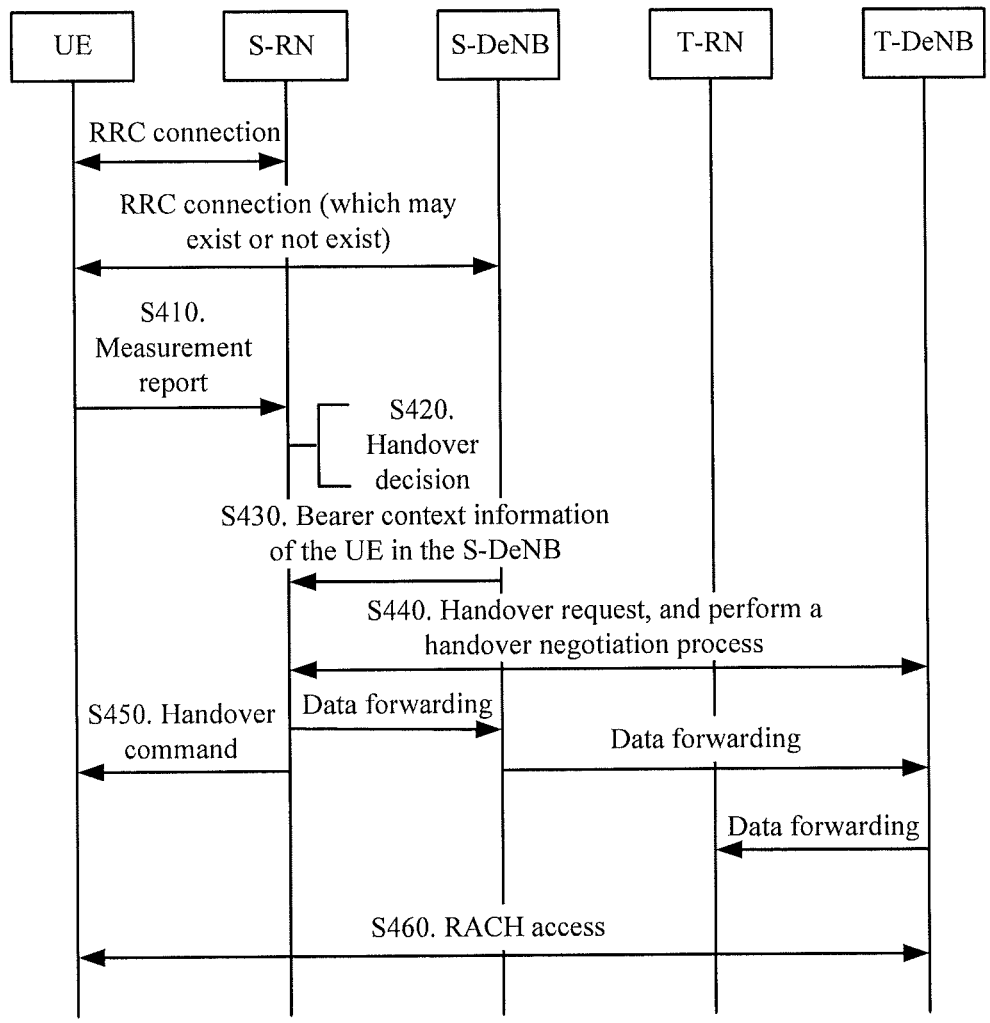
FIG. 4 is a message exchange diagram of handing over a UE to a third base station by a second base station when the second base station needs to access a core network through a first base station.

FIG. 4 is a message exchange diagram of handing over a UE to a third base station by a second base station when the second base station needs to access a core network through a first base station. In this case, the second base station may be an RN, or may also be a home eNB (Home eNB) playing the same role as an RN, a pico eNB (Pico eNB), or other types of base stations; the first base station may be a macro base station, for example, an eNB and a donor base station DeNB (donor evolved NodeB). Therefore, the base station in this embodiment is a base station in a broad sense, and includes a wireless access point serving the UE, for example, a donor base station and a relay station.

In the following description, exemplarily, the second base station is an RN, the first base station is a DeNB, and the third base station is a DeNB. The second base station and the first base station are represented by an S-RN and an S-DeNB respectively because they are source base stations before the handover. The third base station is represented by a T-DeNB because it is a target base station. In addition, the third base station may be other types of base stations. FIG. 4 further shows a relay station T-RN connected to a third base station. Although the UE handover target is the third base station, the third base station may also allocate a part of bearers of the UE to the T-RN.

Persons skilled in the art may easily think that the message exchange diagram is also applicable to other types of base stations in the scenario.

In the example shown in FIG. 4, an RRC connection exists between the UE and the S-RN (source relay station), and an RRC connection may exist or not exist between the UE and the S-DeNB (source base station). The UE performs communication by using carriers of the S-RN and S-DeNB. The S-RN is an Anchor (anchor) base station.

In S410, the UE sends a measurement report to the S-RN, where the measurement report carries a value of a cell measured by the UE under the S-RN and/or S-DeNB.

In S420, the S-RN makes a handover decision based on the measurement report.

In S430, the S-RN obtains bearer context information of the UE in the S-DeNB from the S-DeNB. For example, the S-DeNB notifies the update to the S-RN when updating the bearer context information of the UE, or the S-DeNB notifies the bearer context information of the UE to the S-RN after receiving a request from the S-RN, or the S-DeNB sends the bearer context information of the UE to the S-RN according to a measurement report if the S-DeNB may also receive the measurement report.

In S440, the S-RN adds bearer context information of the UE in the S-RN and the bearer context information obtained in S430 to the handover request and sends the handover request to the T-DeNB (namely, the target base station), and performs a handover negotiation process with the T-DeNB. The process may reuse the handover negotiation procedure in LTE R10. In addition, if an RRC connection also exists between the S-DeNB and the UE, the handover request sent by the S-RN may further carry a base station identifier of the S-DeNB.

In S450, after receiving a handover response, which indicates that the T-DeNB agrees to the handover, the S-RN sends a handover command to the UE.

Because the handover response received by the S-RN is forwarded by the S-DeNB, the S-DeNB also receives the handover response, and forwards the UE data in the S-DeNB to the T-DeNB. If the T-DeNB further expects that a fourth base station also provides data services for the UE (for example, if the third base station is a T-DeNB, the fourth base station is a T-RN), the T-DeNB forwards data to the fourth base station.

In addition, the S-RN may forward the UE data in the S-RN to the third base station after receiving the handover response. Because operations of data forwarding are the same as those in the related technology, details are not further described herein.

In S460, the UE executes a RACH (random access channel) access process to hand over to the third base station.

After the UE is handed over to the third base station, if an RRC connection exists between the UE and the S-DeNB, the third base station may instruct, based on the base station identifier of the S-DeNB, the S-DeNB to release related resources. In addition, after the UE is handed over to the third base station, the UE may actively request the S-DeNB to release related resources of the UE.

Figure 5:
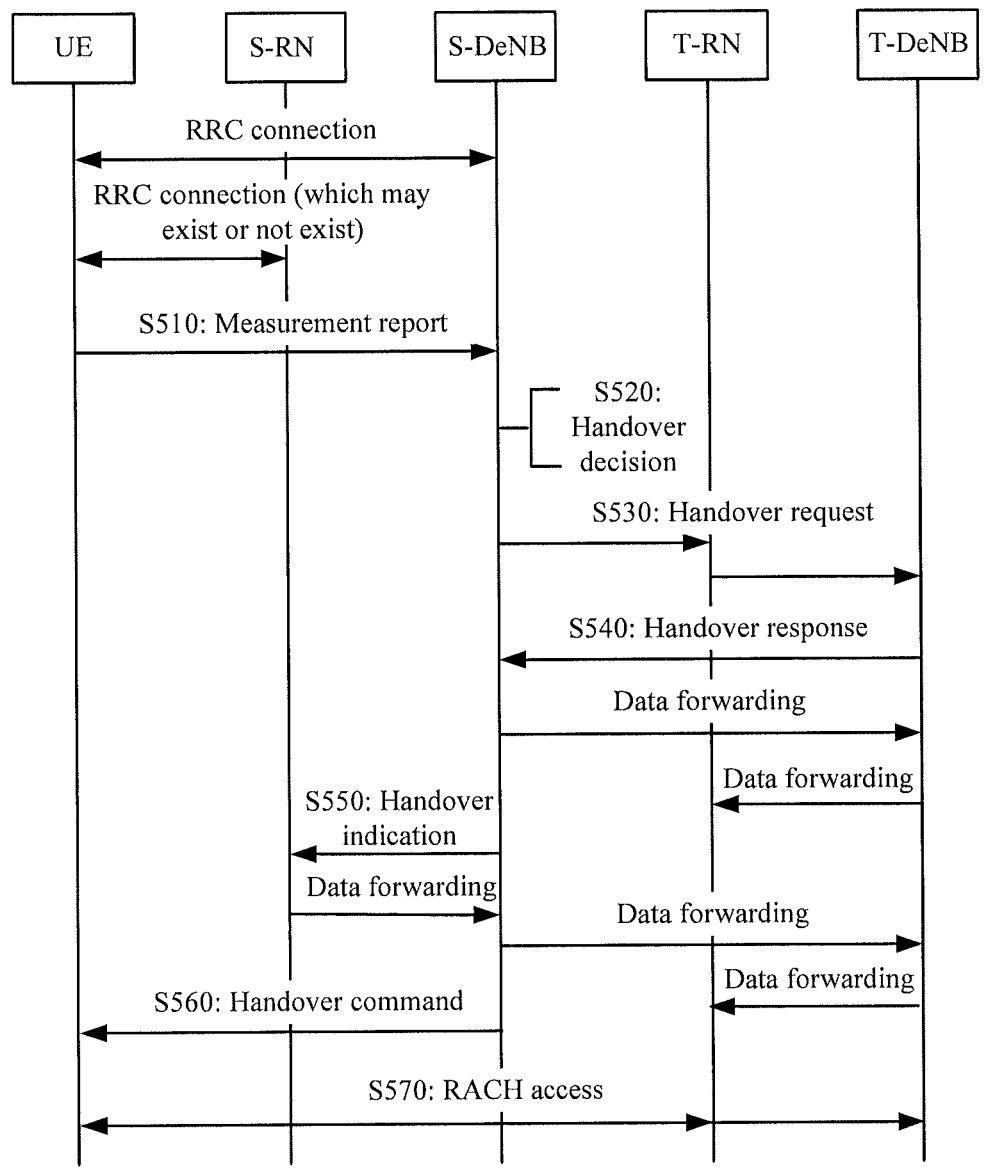
FIG. 5 is a message exchange diagram of handing over a UE to a third base station and a fourth base station by a first base station when a second base station needs to access a core network through the first base station.

FIG. 5 is a message exchange diagram of handing over a UE to a third base station and a fourth base station by a first base station when a second base station needs to access a core network through the first base station. In an example, it is still assumed that the second base station is an S-RN and that the first base station is an S-DeNB. Both the third base station and the fourth base station are target base stations, and may be base stations of any type. Herein it is assumed that the third base station is a T-DeNB and that the fourth base station is a T-RN.

In the example shown in FIG. 5, the UE has established an RRC connection with the S-DeNB, and an RRC connection may exist or not exist between the UE and the S-RN. The UE performs communication by using carriers of the S-DeNB and S-RN, and the S-DeNB is an Anchor base station.

In S510, the UE sends a measurement report to the S-DeNB, where the measurement report carries a value of a cell measured by the UE under the S-RN and/or S-DeNB.

In S520, the S-DeNB makes a handover decision based on the measurement report.

Because the S-DeNB knows all bearer context information of the UE in the S-RN and S-DeNB, it is unnecessary to obtain bearer context information of the UE in the S-RN as described in FIG. 4.

In S530, the S-DeNB needs to hand over the UE to the T-RN (target relay station) and the T-DeNB. Because the T-RN is a relay station of the T-DeNB, the S-DeNB may send the handover request (carrying base station identifiers of the T-RN and T-DeNB) to only the T-DeNB, and then the T-DeNB forwards the handover request to the T-RN based on the base station identifier of the T-RN carried in the handover request. Definitely, the S-DeNB may send the handover request to the T-RN and the T-DeNB respectively. The handover request carries the base station identifiers of the T-RN and T-DeNB, and further carries bearer context information of the UE in the S-DeNB and S-RN.

In this way, the T-RN and T-DeNB may determine, by negotiation, how to allocate bearers of the UE, and determine whether to accept the UE handover. The T-RN and T-DeNB may further negotiate which one of them is used as the master station. In addition, if an RRC connection also exists between the UE and the S-RN, the handover request may further carry a base station identifier of the S-RN, so that the target base station knows existence of the S-RN and instructs, after the handover, the S-RN to release related resources.

In S540, the master station selected from the T-RN and the T-DeNB returns a handover response to the S-DeNB to indicate that they agree to the handover, where the handover response may carry UE bearers undertaken respectively by the T-RN and T-DeNB. Definitely, persons skilled in the art may also think that both the T-RN and T-DeNB may return handover responses to the S-DeNB. The S-DeNB forwards data to the T-RN and T-DeNB after receiving the handover responses.

In S550, the S-DeNB sends a handover indication to the S-RN to instruct the S-RN to forward data to the T-RN and T-DeNB, that is, forward cached data on the UE bearers to the target base stations, so as to implement quick recovery of the current service of the UE.

In S560, the S-DeNB sends a handover command to the UE. This step may also be executed before S550 or executed concurrently with S550.

In S570, the UE executes a RACH access process, for example, the UE may establish an RRC connection with the T-DeNB and T-RN concurrently.

Figure 6:
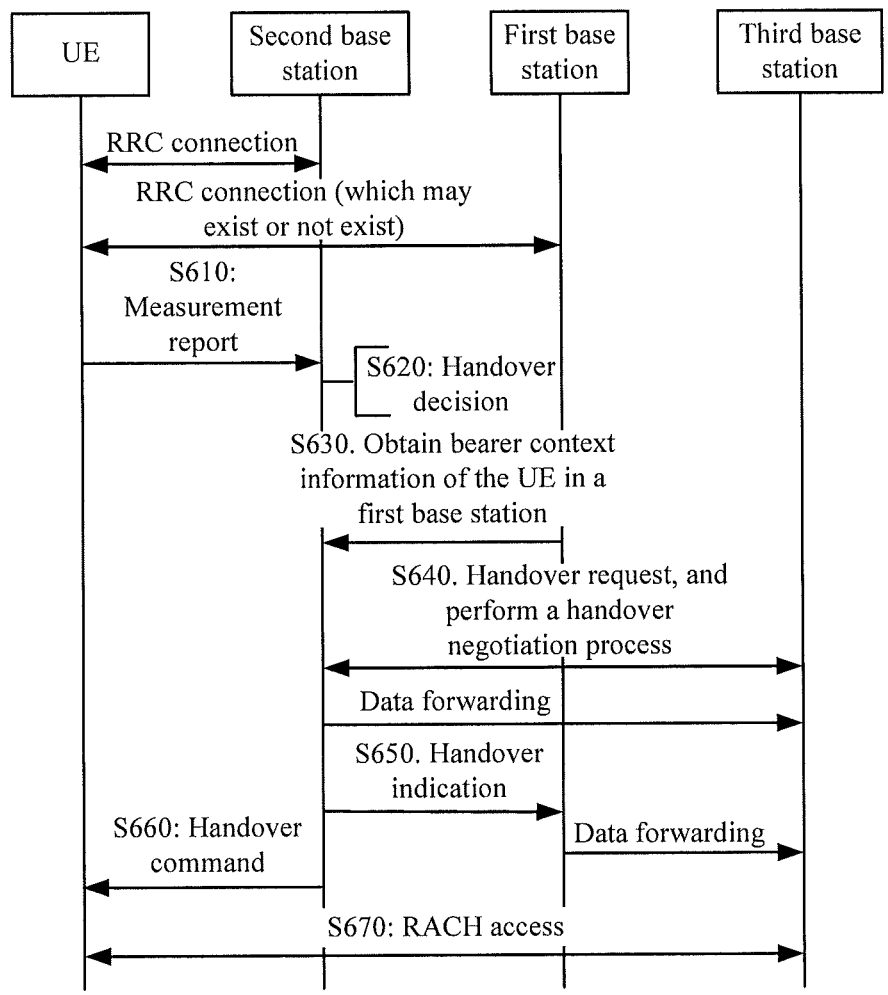
FIG. 6 is a message exchange diagram of handing over a UE to a third base station by a second base station when a first base station and the second base station are independent of each other.

FIG. 6 is a message exchange diagram of handing over a UE to a third base station by a second base station when a first base station and the second base station are independent of each other. The first base station and the second base station are independent of each other, which indicates that the first base station and the second base station can access a core network without each other. For example, the first base station and the second base station may be a Home eNB, a Pico eNB, a DeNB, an RN, and other types of base stations, and types of the first base station and the second base station may be the same or different.

In this example, an RRC connection exists between the UE and the second base station, and an RRC connection may exist or not exist between the UE and the first base station. The UE performs communication by using carriers of the first base station and the second base station, and the second base station is an Anchor (anchor) base station.

In S610, the UE sends a measurement report to the second base station, where the measurement report carries a reported value obtained by measurement when the UE is in the coverage of the second base station and/or the first base station.

In S620, the second base station makes a handover decision based on the measurement report.

In S630, the second base station obtains bearer context information of the UE from the first base station.

In S640, the second base station sends a handover request to the third base station, where the handover request carries all bearer context information of the UE in the first base station and the second base station, and performs a handover negotiation process with the third base station. The process may reuse the handover negotiation procedure in LTE R10. When agreeing to the handover, the third base station returns a handover response to the second base station indicating that the handover is agreed to, and the second base station forwards data to the third base station based on the handover response.

In S650, after receiving the handover response from the third base station agreeing to the handover, the second base station sends a handover indication to the first base station, so that the first base station forwards UE data to the third base station based on the handover indication.

In S660, the second base station sends a handover command to the UE. The handover command may also be sent before or when the handover indication is sent.

In S670, the UE executes a RACH access process to hand over to the third base station.

Figure 7:
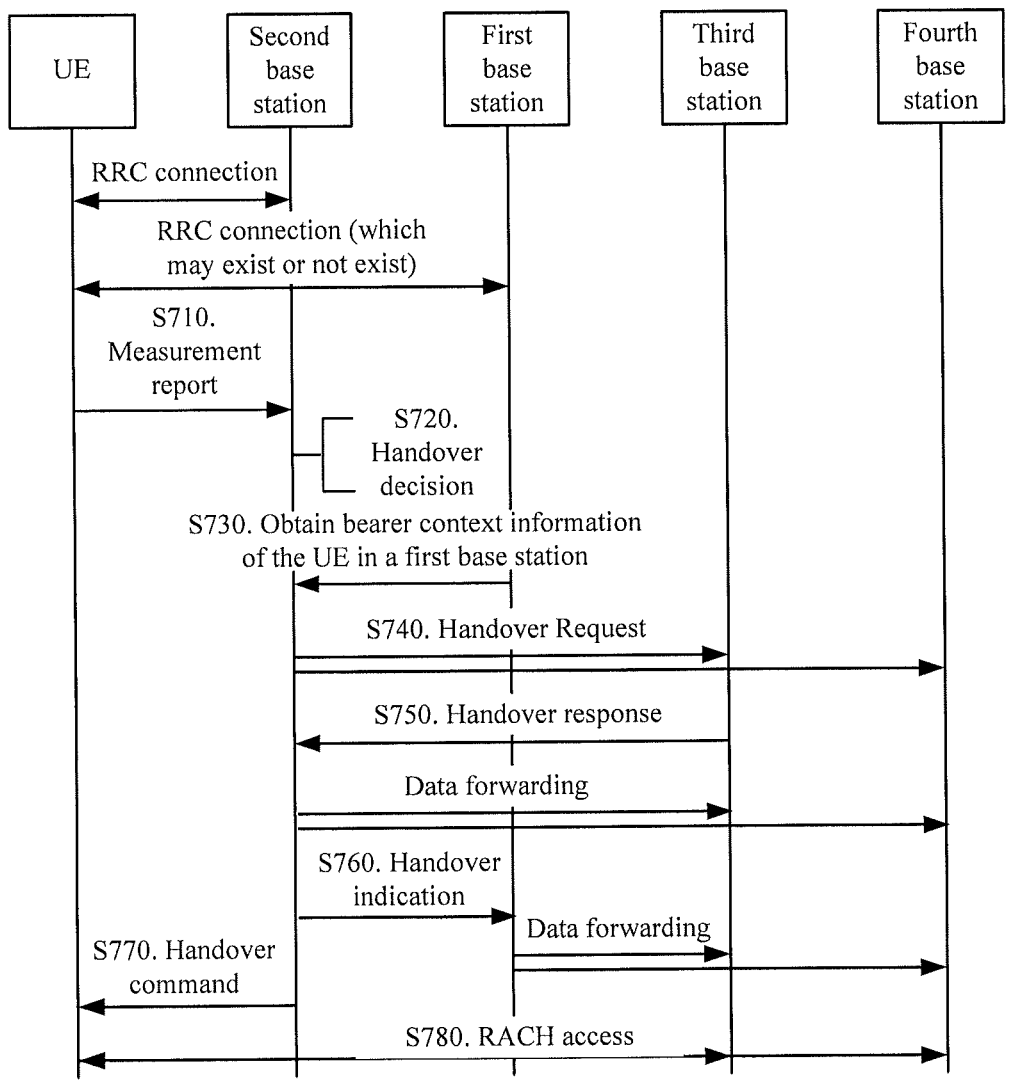
FIG. 7 is a message exchange diagram of handing over a UE to a third base station and a fourth base station by a second base station when a first base station and the second base station are independent of each other.

FIG. 7 is a message exchange diagram of handing over a UE to a third base station and a fourth base station by a second base station when a first base station and the second base station are independent of each other. In this example, the UE needs to be handed over two to target base stations. The third base station and fourth base station may be a Home eNB, a Pico eNB, a DeNB, an RN, and other types of base stations. There is no limitation on whether one of the third base station and the fourth base station needs to access the core network through the other.

In this example, the UE has established an RRC connection with the second base station, and an RRC connection may exist or not exist between the UE and the first base station. The UE performs communication by using carriers of the first base station and the second base station, and the second base station is an Anchor base station.

S710, S720, and S730 are basically the same as S610, S620, and S630.

In S740, the second base station sends a handover request to the third base station and the fourth base station respectively. The handover request carries base station identifiers of the third base station and the fourth base station, and further carries bearer context information of the UE in the first base station and the second base station. In this way, the third base station and the fourth base station may determine, by negotiation, how to allocate bearers of the UE, and when both may accept bearers of the UE, a UE handover may be performed. The third base station and the fourth base station may further negotiate which one of them is used as the master station.

In S750, the master station (for example, the third base station) selected from the third base station and/or the fourth base station returns a handover response to the second base station indicating that the handover is agreed to. Definitely, persons skilled in the art may also think that both the third base station and the fourth base station may return handover responses to the second base station.

In S760, the second base station sends a handover indication to the first base station, so as to instruct the first base station to forward data to the third base station and the fourth base station. Definitely, the second base station also forwards data to the third base station and the fourth base station after receiving the handover response.

In S770, the second base station sends a handover command to the UE. S760 and S770 may be executed concurrently, or S760 may be executed after S770.

In S780, the UE executes a RACH access process, for example, the UE may establish an RRC connection with the third base station and the fourth base station concurrently.

Figure 8:
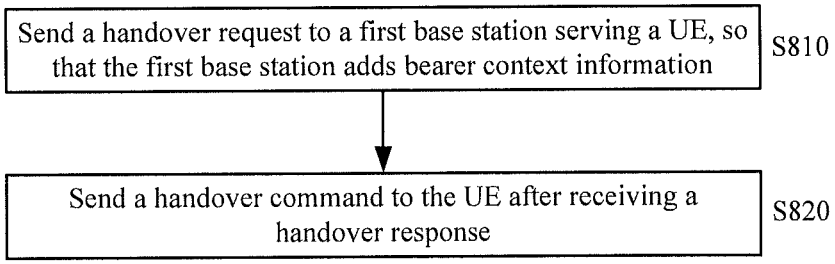
FIG. 8 is a flowchart of another handover method according to an embodiment of the present invention.

FIG. 8 is a flowchart of a handover method 800 according to an embodiment of the present invention.

As shown in FIG. 8, the method 800 includes: in S810, when a UE needs to be handed over, sending a handover request to a first base station serving the UE, so that the first base station adds bearer context information of the UE in the first base station to the handover request and forwards the handover request to a target base station; and in S820, after receiving a handover response indicating that the handover is agreed to, which is forwarded by the first base station and is returned by the target base station, sending a handover command to the UE, so that the UE is handed over to the target base station.

For example, the method 800 may be executed by a second base station. The first base station and the second base station are source base stations serving the UE before the handover. The UE and the second base station performing a UE handover have established an RRC connection. An RRC connection may exist or not exist between the UE and the first base station. The second base station is an Anchor base station. The second base station needs to access the core network through the first base station, that is, the data sent by the second base station to the network side needs to be forwarded by the first base station, for example, the second base station may be an RN, and the first base station may be a DeNB.

In S810, when determining, according to a measurement report of the UE, to hand over the UE, the second base station sends a handover request to the target base station. Because the message sent by the second base station to the network side needs to be sent through the first base station, the first base station receives the handover request. After receiving the handover request, the first base station actively adds bearer context information of the UE in the first base station to the handover request, and then forwards the handover request to the target base station. In this way, the target base station can obtain all bearer context information of the UE in the first base station and the second base station from the handover request, and therefore determine whether to accept the UE handover.

In S820, when agreeing to the UE handover, the target base station returns a handover response to the first base station to indicate that it agrees to the handover, and the first base station commands the UE to perform the handover.

According to the handover method provided by the embodiment of the present invention, when a UE uses carrier aggregation before a handover and therefore has established a data connection with both a first base station and a second base station, the second base station performing the handover can hand over the UE to a target base station even if bearer context information of the UE in the first base station is not obtained. In this case, the first base station needs to add bearer context information to the received handover request, so that the target base station may determine, based on all bearer context information, whether to accept the handover. In this way, the UE in the carrier aggregation state can be smoothly handed over to a new base station, and the current service of the UE can be recovered quickly, thereby improving communication experience of a user.

Figure 9:
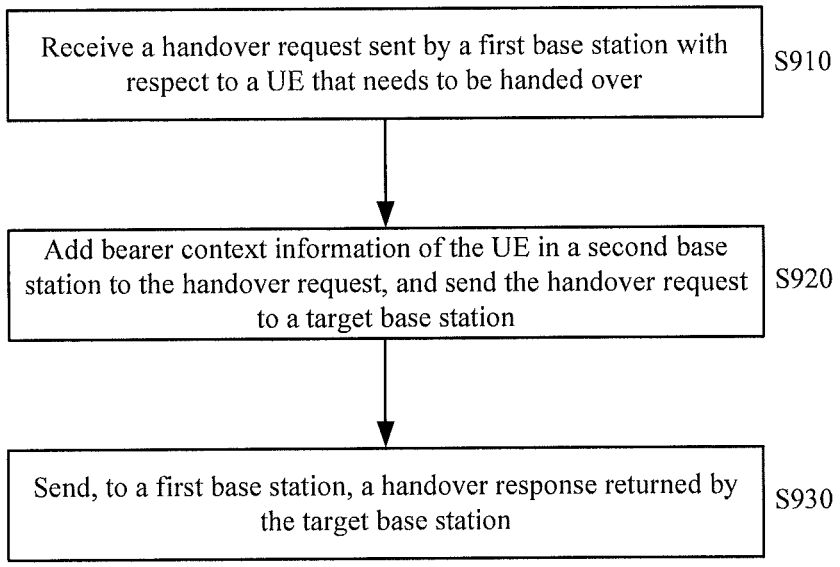
FIG. 9 is a flowchart of another handover method according to an embodiment of the present invention.

FIG. 9 is a flowchart of a handover method 900 according to an embodiment of the present invention. The technical solutions of the method 900 and the method 800 are basically the same, except they are described from perspectives of different executors.

As shown in FIG. 9, the method 900 includes: in S910, receiving a handover request sent by a first base station for a UE that needs to be handed over; in S920, adding bearer context information of the UE in a second base station to the received handover request, and sending the handover request to a target base station, where the bearer context information is used for the target base station to determine whether to accept the UE handover; and in S930, sending, to the first base station, a handover response that is returned by the target base station and indicates that the handover is agreed to, so as to instruct the first base station to send a handover command to the UE based on the handover response, where the handover command is used to instruct the UE to perform handover to the target base station.

For example, the method 900 may be executed by a second base station. The second base station and the first base station are source base stations for the UE. An RRC connection exists between the first base station performing the UE handover and the UE, and an RRC connection may exist or not exist between the second base station and the UE. The first base station is an Anchor base station. The first base station can access a core network only through the second base station. For example, the first base station may be an RN, and the second base station may be a DeNB.

In S910, the first base station determines, based on a measurement report reported by the UE, that the UE needs to be handed over, and sends a handover request.

In S920, because a message sent by the first base station to the network side needs to pass through the second base station, the second base station may also receive the handover request sent by the first base station. After receiving the handover request, the second base station adds bearer context information of the UE in the second base station to the handover request. Afterward, the second base station forwards the handover request carrying the added bearer context information in the second base station to the target base station.

In S930, if the target base station agrees to accept the handover, the target base station sends a handover response to indicate that it agrees to the handover. After receiving the handover response, the second base station forwards the handover response to the first base station. The first base station commands the UE to perform the handover.

According to the handover method provided by the embodiment of the present invention, when a UE uses carrier aggregation before a handover and therefore has established a data connection with both a first base station and a second base station, the first base station performing the handover can hand over the UE to a target base station even if bearer context information of the UE in the second base station is not obtained. In this case, the second base station needs to add bearer context information to the received handover request, so that the target base station may determine, based on all bearer context information, whether to accept the handover. In this way, the UE in the carrier aggregation state can be smoothly handed over to a new base station, and the current service of the UE can be recovered quickly, thereby improving communication experience of a user.

According to an embodiment of the present invention, the target base station may include a first target base station and a second target base station; in this case, the handover request needs to carry a base station identifier of the first target base station and a base station identifier of the second target base station.

In this case, when the first target base station receives the handover request, the first target base station determines, by negotiation with the second target base station based on the base station identifier of the second target base station, bearers of the UE to be undertaken respectively by the first target base station and the second target base station.

After determining, by negotiation, bearers of the UE undertaken respectively, the first target base station and the second target base station may hand over the UE to the first target base station and the second target base station.

According to an embodiment of the present invention, the first target base station may determine a master station by negotiation with the second target base station based on the base station identifier of the second target base station.

The master station may be determined by using multiple methods. For example, the first target base station may determine the master station according to the sequence of receiving the handover request by the first target base station and the second target base station. For another example, the first target base station may determine the master station according to a predetermined configuration. For another example, the first target base station may determine the master station according to the sequence of establishing an RRC connection with the UE by the first target base station and the second target base station. For another example, the first target base station may determine the master station according to the sequence of carrying the base station identifier of the first target base station and the base station identifier of the second target base station by the handover request. For another example, the first target base station may determine the master station according to a response message returned by the second target base station in response to a request message sent by the first target base station for requesting to determine the master station. For the description about the related content, reference may be made to the description above; for avoiding repetition, related description is not further described herein.

Figure 10:
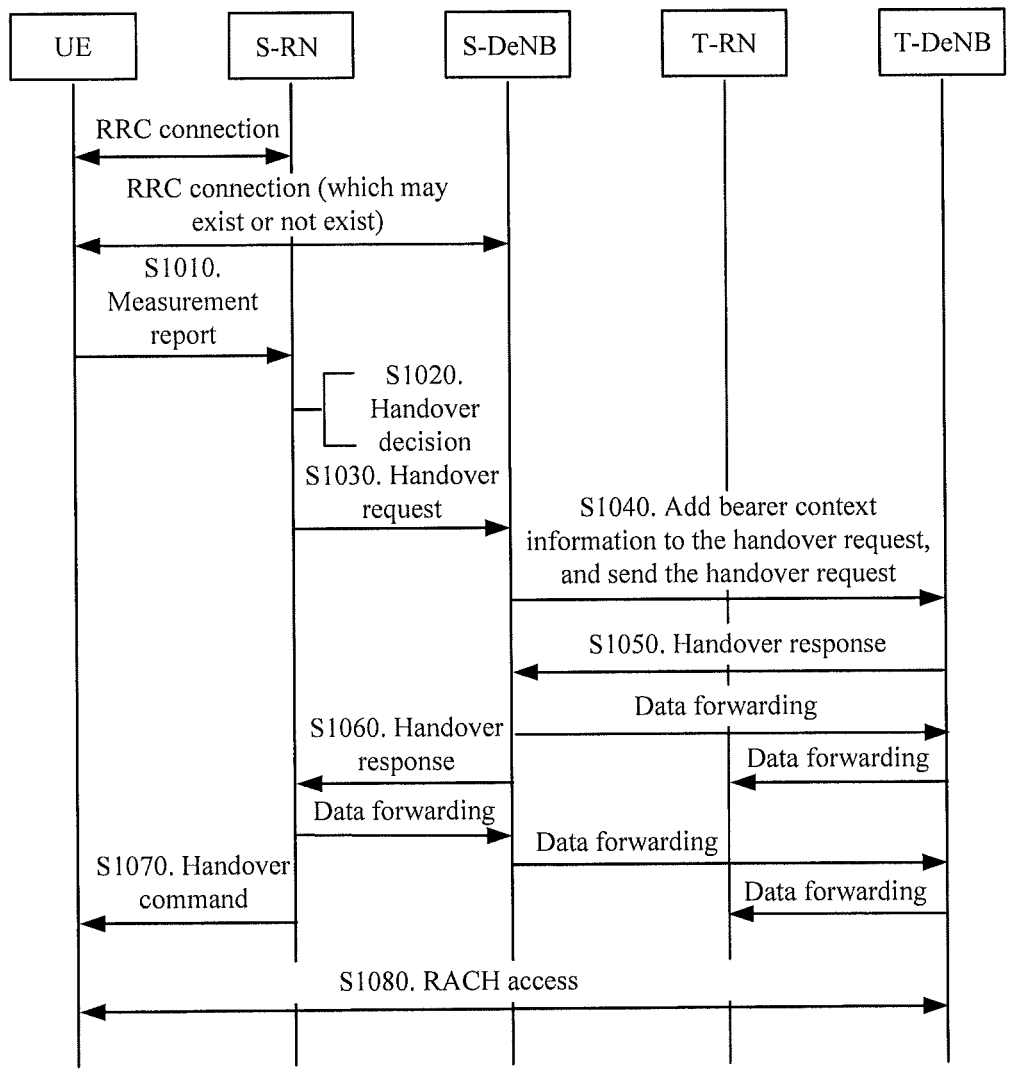
FIG. 10 is a message exchange diagram of handing over a UE to a third base station by a second base station when the second base station needs to access a core network through a first base station.
Figure 11:
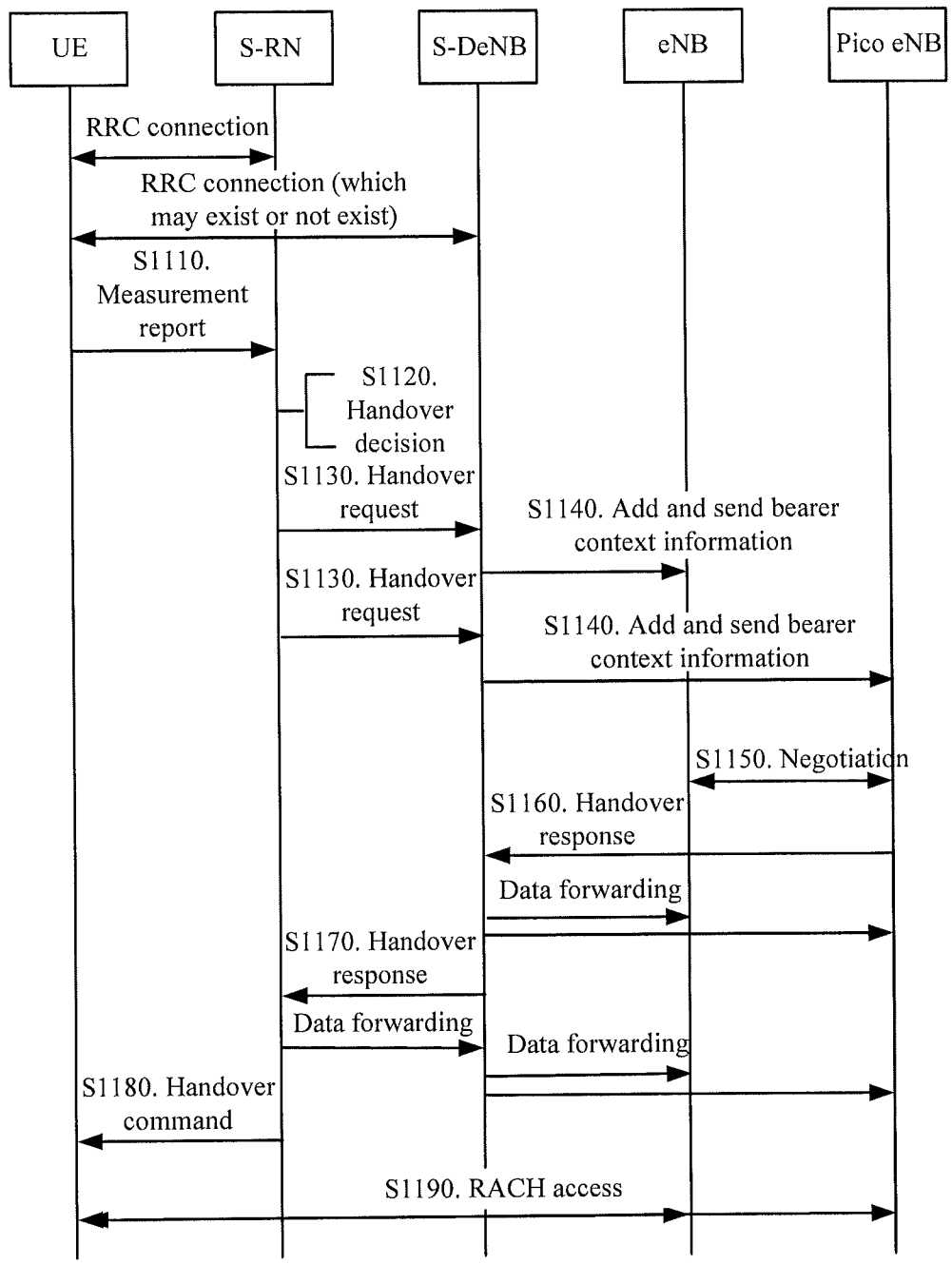
FIG. 11 is a message exchange diagram of handing over a UE to a third base station and a fourth base station by a second base station when the second base station needs to access a core network through a first base station.

The following describes examples of the method 800 and method 900 with reference to FIG. 10 and FIG. 11.

FIG. 10 is a message exchange diagram of handing over a UE to a third base station by a second base station when the second base station needs to access a core network through a first base station. In this example, the second base station is an RN, and the first base station is a DeNB; the base stations may also be represented by an S-RN and an S-DeNB because they are source base stations. The third base station is a DeNB, and may also be represented by a T-DeNB because it is a target base station. Definitely, persons skilled in the art may also easily think that the first, second, and third base stations may also be other types of base stations, and that the message exchange described in this example may also be applied to other similar network architectures.

In the example of FIG. 10, an independent RRC connection is maintained between the UE and the S-RN. An RRC connection may exist or not exist between the UE and the S-DeNB. The S-RN controls the UE, and the RN is an Anchor base station.

In S1010, the UE sends a measurement report to the S-RN, where the measurement report carries a value of a cell measured by the UE under the S-RN and/or S-DeNB.

In S1020, the S-RN makes a handover decision based on the measurement report.

In S1030, the S-RN sends a handover request to the T-DeNB, where the handover request needs to pass through the S-DeNB.

In S1040, the S-DeNB adds bearer context information of the UE in the S-DeNB to the handover request, and forwards the handover request after the adding to the T-DeNB.

In S1050, after agreeing to the UE handover, the T-DeNB returns a handover response to the S-RN, where the handover response first arrives at the S-DeNB. Because the S-DeNB receives the handover response indicating that the handover is agreed to, the S-DeNB may forward data to the T-DeNB as described in the related technology. If the T-DeNB expects that its RN may also undertake a part of bearers of the UE, the T-DeNB may further forward the data to the RN (represented by a T-RN).

In S1060, the S-DeNB forwards the handover response to the S-RN. The S-RN may also forward the data to the T-DeNB as described in the related technology. The T-DeNB may further forward the data to the T-RN.

In S1070, the S-RN sends a handover command to the UE.

In S1080, the UE executes a RACH access process to hand over to the T-DeNB.

After the UE is handed over to the T-DeNB, if an RRC connection exists between the UE and the S-DeNB, the T-DeNB may instruct, based on the base station identifier of the S-DeNB, the S-DeNB to release related resources. In addition, after being handed over to the T-DeNB, the UE may also actively request the S-DeNB to release context information of the UE.

FIG. 11 is a message exchange diagram of handing over a UE to a third base station and a fourth base station by a second base station when the second base station needs to access a core network through a first base station. In this example, the first base station and the second base station are still an S-DeNB and an S-RN respectively; the third base station and the fourth base station are both target base stations and may be base stations of any type. Herein it is assumed that the third base station is an eNB, and that the fourth base station is a Pico eNB.

In FIG. 11, an RRC connection exists between the UE and the S-RN; an RRC connection may exist or not exist between the UE and the S-DeNB; the S-RN is an Anchor base station.

In S1110, the UE sends a measurement report to the S-RN, where the measurement report carries a value of a cell measured by the UE under the S-RN and/or S-DeNB.

In S1120, the S-RN makes a handover decision based on the measurement report.

In S1130, the S-RN sends a handover request to the eNB and Pico eNB respectively, where the handover request needs to pass through the S-DeNB. The handover request needs to carry base station identifiers of the eNB and Pico eNB.

In S1140, the S-DeNB respectively adds bearer context information of the UE in the S-DeNB to the handover request, and forwards the handover request after the adding to the eNB and Pico eNB.

In S1150, after receiving the handover request, the eNB and Pico eNB may determine, by negotiation based on the base station identifier of each other, how to allocate bearers of the UE in the S-RN and S-DeNB. If both the eNB and the Pico eNB may accept the UE handover, it means that both of them may accept the UE handover. In addition, the eNB and Pico eNB may further negotiate which one of them is used as the master station.

In S1160, the master station (assuming that the master station is the Pico eNB) selected from the eNB and Pico eNB returns a handover response to the S-RN to indicate that it agrees to the handover, where the handover response may carry UE bearers undertaken respectively by the eNB and Pico eNB. Definitely, persons skilled in the art may also think that both the eNB and the Pico eNB may return handover responses to the S-RN. The handover response first arrives at the S-DeNB, and the S-DeNB forwards data to the eNB and Pico eNB.

In S1170, the S-DeNB forwards the handover response to the S-RN, and the S-RN forwards data to the eNB and Pico eNB.

In S1180, the S-RN commands the UE to perform the handover.

In S1190, the UE executes a RACH access process, for example, an RRC connection may be established with the eNB and Pico eNB concurrently.

Figure 12:
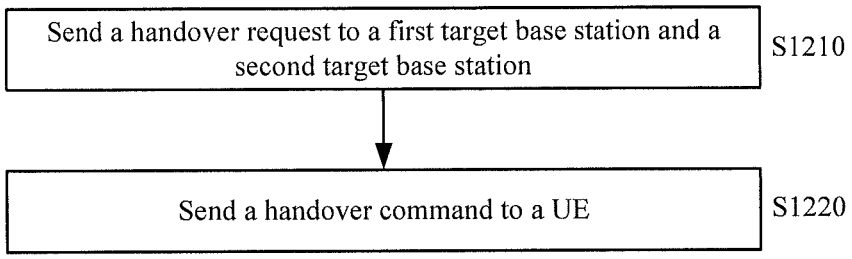
FIG. 12 is a flowchart of another handover method according to an embodiment of the present invention.

FIG. 12 is a flowchart of a handover method 1200 according to an embodiment of the present invention.

As shown in FIG. 12, the method 1200 includes: in S1210, when a UE needs to be handed over, sending a handover request to a first target base station and a second target base station, where the handover request carries bearer context information of the UE and a base station identifier of the first target base station and a base station identifier of the second target base station, so that the first target base station determines, by negotiation with the second target base station based on the base station identifier of the second target base station, bearers that are related to the bearer context information and need to be undertaken respectively by the first target base station and the second target base station; and in S1220, after receiving handover responses indicating that the handover is agreed to, which are returned by the first target base station and the second target base station, sending a handover command to the UE, so as to instruct the UE to perform handover to the first target base station and the second target base station.

For example, the method 1200 may be executed by a source base station for the UE, and the source base station performs the handover for the UE. No matter whether the UE before the handover uses the carrier aggregation technology, after the handover, the UE needs to establish connections with the two target base stations.

In S1210, the source base station sends a handover request to the first target base station and the second target base station respectively, where the handover request carries bearer context information of the UE in the source base station; if it is not only necessary to change bearers of the UE in the source base station, but also necessary to change bearers of the UE in another source base station serving the UE, the handover request carries bearer context information of the UE in the two source base stations.

In addition, the handover request may carry base station identifiers of the first target base station and the second target base station. In this way, they can be aware of existence of each other, and perform interaction with each other based on the base station identifiers thereof, so as to implement the UE handover.

The first target base station and the second target base station determine how to allocate the bearers of the UE to the two target base stations. If all bearers to be handed over can be accepted by the two target base stations, the two target base stations may accept the UE handover. When agreeing to the UE handover, the two target base stations may return handover responses to the source base station to indicate that they agree to the handover. The handover responses may carry a UE bearer allocation result.

In S1220, after receiving the handover responses indicating that the handover is agreed to, the source base station forwards data to the first target base station and the second target base station respectively, so as to quickly recover the current service of the UE, and sends a handover command to the UE so that the UE is handed over to the first target base station and the second target base station.

According to the handover method provided by the embodiment of the present invention, base station identifiers of the first target base station and the second target base station are carried in a handover request, so that the two target base stations can determine, by negotiation based on the base station identifiers, UE bearers to be undertaken. In this way, the UE can be handed over to two target base stations, and the current service of the UE can be recovered quickly, which improves communication experience of a user.

Figure 13:
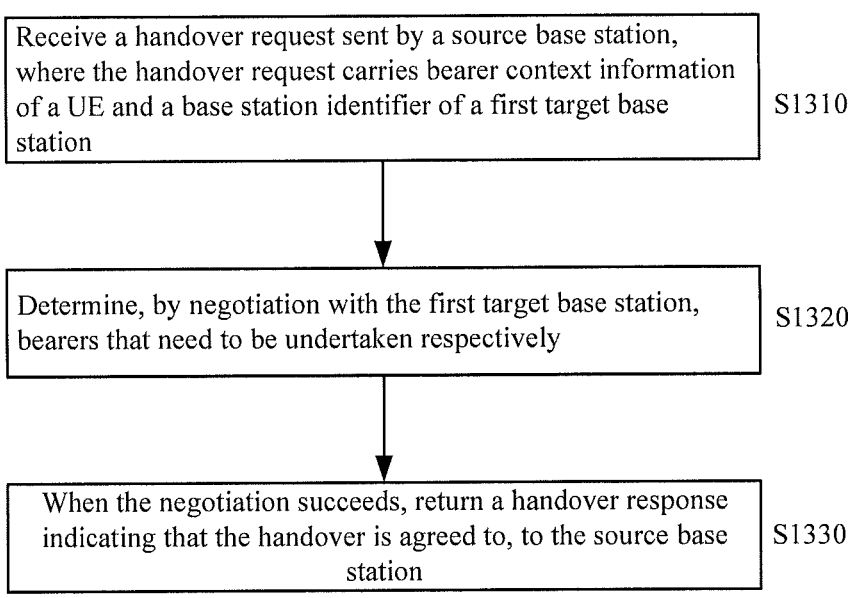
FIG. 13 is a flowchart of another handover method according to an embodiment of the present invention.

FIG. 13 is a flowchart of a handover method 1300 according to an embodiment of the present invention. The technical solutions of the method 1300 and the method 1200 are basically the same, except the executors are different.

As shown in FIG. 13, the method 1300 includes: in S1310, receiving a handover request sent by a source base station for a UE that needs to be handed over, where the handover request carries bearer context information of the UE and a base station identifier of the first target base station; in S1320, determining, by negotiation with the first target base station based on the base station identifier of the first target base station, bearers that are related to the bearer context information and need to be undertaken respectively by the first target base station and the second target base station; and in S1330, when the negotiation succeeds, returning a handover response to the source base station to indicate that the handover is agreed to.

For example, the method 1300 may be executed by a second target base station. The first base station and the second target base station are target base stations to which the UE needs to be handed over, and the UE needs to establish RRC connections with both the first target base station and the second target base station. For related content of S1310 to S1330, reference may be made to the description of S1210 and S1220.

According to an embodiment of the present invention, the second target base station may further determine a master station by negotiation with the first target base station based on the base station identifier of the first target base station.

The master station may be determined by using multiple methods. For example, the second target base station may determine the master station from the first target base station and the second target base station according to the sequence of receiving the handover request by the first target base station and the second target base station. For another example, the second target base station may determine the master station according to a predetermined configuration. For another example, the second target base station may determine the master station from the two target base stations according to the sequence of establishing an RRC connection with the UE by the first target base station and the second target base station. For another example, the second target base station may determine the master station from the two target base stations according to the sequence of carrying the base station identifier of the first target base station and the base station identifier of the second target base station by the handover request. For another example, the second target base station may determine the master station from the two target base stations according to a response message returned by the first target base station in response to a request message sent by the second target base station to the first target base station for requesting to determine the master station. For related content, reference may be made to the related description in the above method 200.

For examples of related operations for handing over the UE to the first target base station and the second target base station, reference may be made to the related description of FIG. 5, FIG. 7, and FIG. 11.

According to the handover method provided by the embodiment of the present invention, base station identifiers of the first target base station and the second target base station are carried in a handover request, so that the two target base stations can determine, by negotiation based on the base station identifiers, UE bearers to be undertaken. In this way, the UE can be handed over to two target base stations, and the current service of the UE can be recovered quickly, which improves communication experience of a user.

Figure 14:
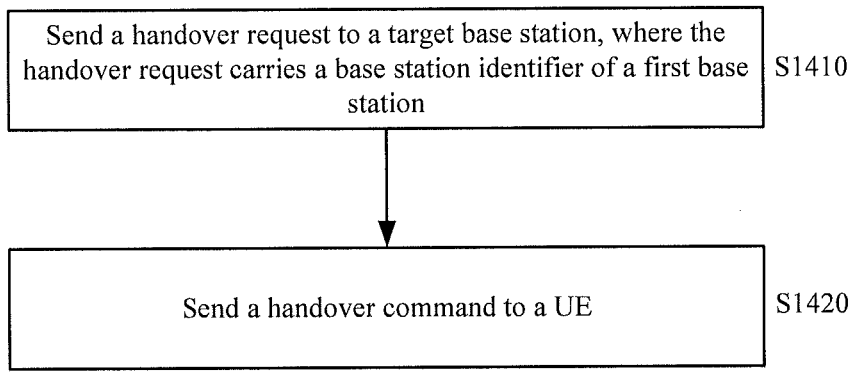
FIG. 14 is a flowchart of another handover method according to an embodiment of the present invention.

FIG. 14 is a flowchart of a handover method 1400 according to an embodiment of the present invention.

As shown in FIG. 14, the method 1400 includes: in S1410, if a UE has established an RRC connection with a first base station and a second base station respectively, when the UE needs to be handed over from the second base station to a target base station, sending a handover request to the target base station, where the handover request carries a base station identifier of the first base station, so that the target base station performs interaction with the first base station based on the base station identifier of the first base station; and in S1420, after receiving a handover response that is returned by the target base station and indicates that the handover is agreed to, sending a handover command to the UE, so as to instruct the UE to perform handover to the target base station.

For example, the method 1400 may be executed by the second base station, and the first base station and the second base station are source base stations. Both the first base station and the second base station have established RRC connections with the UE, and the second base station is an Anchor base station. In this case, the performed handover is handing over the UE from the second base station to the target base station. There may be one or more target base stations, and the RRC connection between the UE and the first base station remains unchanged.

In S1410, the second base station sends a handover request, which needs to carry bearer context information of the UE in the second base station so that the target base station accepts bearers of the UE in the second base station. It is important that the handover request needs to carry the base station identifier of the first base station. In this way, the target base station may find the first base station by using the identifier, and further perform interaction with the first base station to better serve the UE.

In S1420, if the target base station agrees to the handover, the second base station hands over the UE to the target base station. The UE after the handover maintains RRC connections with both the first base station and the target base station, and the target base station may perform communication or interaction with the first base station by using the base station identifier of the first base station.

The interaction between the target base station and the first base station may occur before or after completion of the handover. For example, the target base station may negotiate with the first base station based on the base station identifier of the first base station about whether UE bearers need to be transferred. For example, assuming that the UE has four bearers in the first base station and will have eight bearers in the target base station after the handover, the target base station may negotiate with the first base station about whether to transfer two of the eight bearers to the first base station.

For another example, when the UE receives services provided by the first base station and the target base station, if the target base station decides to perform a handover for the UE again, the target base station may hand over the UE from two source base stations (namely, the target base station and the first base station) to a new base station based on the base station identifier of the first base station. For example, as described above, the target base station may obtain bearer context information of the UE from the first base station based on the base station identifier of the first base station, and send a handover indication to the first base station, and so on.

According to the handover method provided by the embodiment of the present invention, when one RRC connection of a UE having two RRC connections needs to be handed over, a base station identifier of a source base station that keeps the RRC connection unchanged is carried in a handover request, so that a target base station can quickly discover the source base station and perform interaction with the source base station. In this way, the source base station and the target base station can cooperate better to serve the UE, and the impact caused by the handover to communication experience of a user is reduced.

Figure 15:
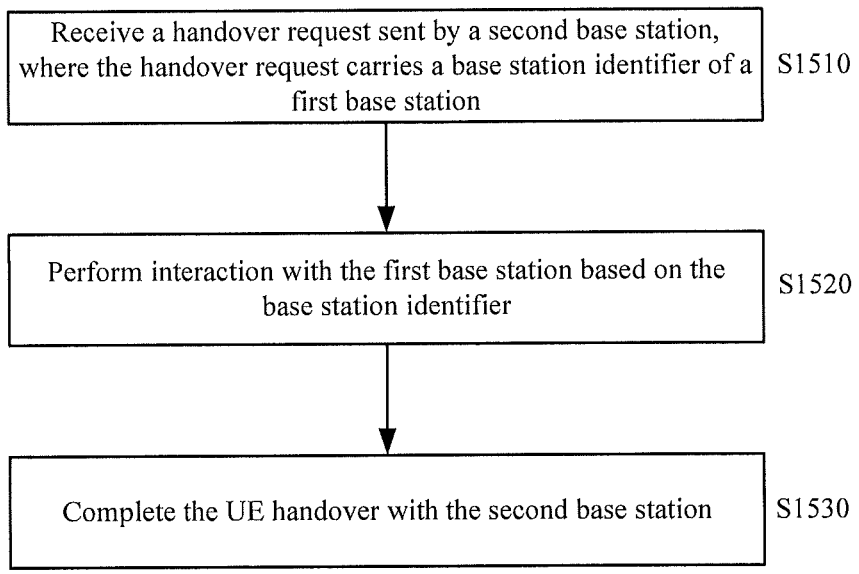
FIG. 15 is a flowchart of another handover method according to an embodiment of the present invention.

FIG. 15 is a flowchart of a handover method 1500 according to an embodiment of the present invention. The method 1500 is basically the same as the method 1400, except the executors are different.

As shown in FIG. 15, the method 1500 includes: in S1510, if a UE has established an RRC connection with a first base station and a second base station respectively, when the UE needs to be handed over from the second base station to a target base station, receiving a handover request sent by the second base station, where the handover request carries a base station identifier of the first base station; in step 1520, performing interaction with the first base station based on the base station identifier; and in S1530, when determining, based on the handover request, to agree to the handover, completing the UE handover with the second base station.

For example, the method 1500 may be executed by a target base station. For related operations of S1510 to S1530, reference may be made to S1410 and S1420 in the above method 1400; for avoiding repetition, related operations are not further described herein. Although S1520 is executed before S1530, S1520 may also be executed after S1530.

According to the handover method provided by the embodiment of the present invention, when one RRC connection of a UE having two RRC connections needs to be handed over, a base station identifier of a source base station that keeps the RRC connection unchanged is carried in a handover request, so that a target base station can quickly discover the source base station and perform interaction with the source base station. In this way, the source base station and the target base station can cooperate better to serve the UE, and the impact caused by the handover to communication experience of a user is reduced.

Figure 16:
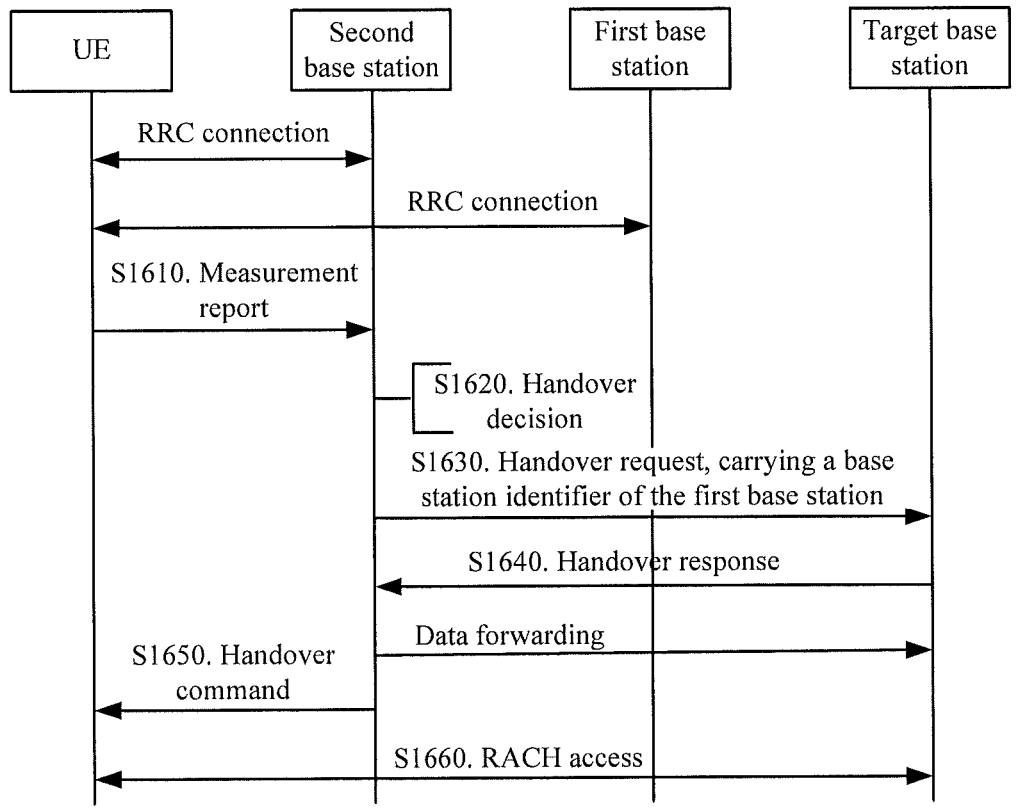
FIG. 16 is a message exchange diagram of handing over a UE to a target base station by a second base station while reserving an RRC connection between a first base station and the UE when both the first base station and the second base station have established RRC connections with the UE.

FIG. 16 is a message exchange diagram of handing over a UE to a target base station by a second base station while reserving an RRC connection between a first base station and the UE when both the first base station and the second base station have established RRC connections with the UE.

In this example, the first base station and the second base station may be base stations of any type; the first base station and the second base station may be independent of each other, or one of them needs to access a core network through the other. Both the first base station and the second base station have established RRC connections with the UE, and the second base station is an Anchor base station.

In S1610, the UE sends a measurement report to the second base station, where the measurement report may carry a value of a cell measured by the UE under the first base station and/or the second base station.

In S1620, the second base station makes a handover decision based on the measurement report.

In S1630, if the second base station determines to perform a handover for the UE but does not change the RRC connection between the UE and the first base station, the second target base station sends a handover request to the target base station, where the handover request carries bearer context information of the UE in the second base station. It is more important that the handover request carries a base station identifier of the first base station to indicate existence of the first base station to the target base station. Although FIG. 16 shows only one target base station, there may be multiple target base stations. Inspired by the above description, persons skilled in the art may easily think how to implement this step, for example, carrying a base station identifier of a first target base station and a base station identifier of a second target base station in the handover request, so that the two target base stations determine by negotiation how to allocate bearers of the UE.

In S1640, when the target base station agrees to the handover, the second base station receives a handover response indicating that the handover is agreed to from the target base station, and forwards UE data to the target base station.

In S1650, the second base station sends a handover command to the UE.

In S1660, the UE is handed over to the target base station.

Because the handover request carries the base station identifier of the first base station, the target base station may perform interaction with the first base station before and/or after completion of the handover to better serve the UE.

The above describes the handover method according to the embodiments of the present invention; the following describes the base station according to the embodiments of the present invention with reference to FIG. 17 to FIG. 26.

Figure 17:
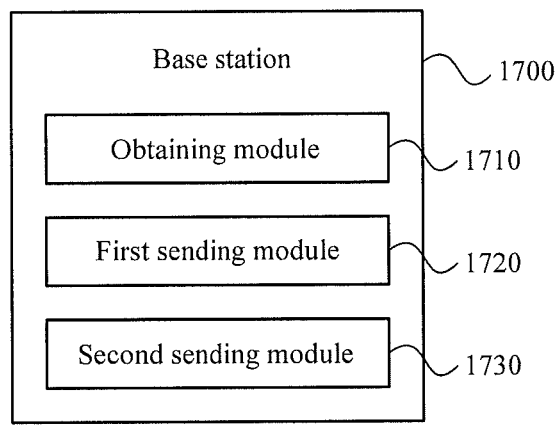
FIG. 17 is a structural block diagram of a base station according to an embodiment of the present invention.

FIG. 17 is a structural block diagram of a base station 1700 according to an embodiment of the present invention.

The base station 1700 includes an obtaining module 1710, a first sending module 1720, and a second sending module 1730, which may be implemented respectively by different processor units. The obtaining module 1710 may be configured to: when a user equipment UE needs to be handed over, obtain bearer context information of the UE in a first base station, where the first base station is a source base station for the UE. The first sending module 1720 may be configured to send a handover request to a target base station, where the handover request carries the bearer context information, where the bearer context information is used for the target base station to determine whether to accept the UE handover. The second sending module 1730 may be configured to: after a handover response that is returned by the target base station and indicates that the handover is agreed to is received, send a handover command to the UE, so as to instruct the UE to perform handover to the target base station.

The above and other operations and/or functions of the obtaining module 1710, the first sending module 1720, and the second sending module 1730 are not further described herein for avoiding repetition. For details, reference may be made to the related content in the above method 100.

According to the base station provided by the embodiment of the present invention, when a UE uses carrier aggregation before a handover, the base station obtains bearer context information of the UE in a first base station, so that a target base station helps to determine, based on all bearers in the first base station and the second base station, whether to agree to the UE handover. In this way, if the target base station agrees to the handover, the UE can be handed over from the first base station and the second base station to the target base station, so that the UE that is using carrier aggregation can be handed over quickly, which may improve communication experience of a user in the handover process.

Figure 18:
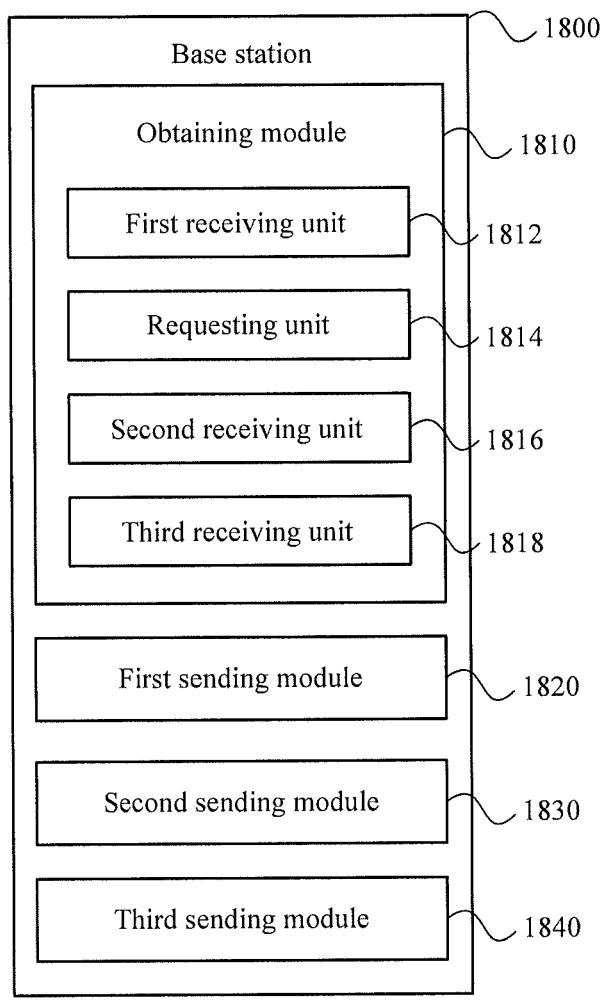
FIG. 18 is a structural block diagram of another base station according to an embodiment of the present invention.

FIG. 18 is a structural block diagram of a base station 1800 according to an embodiment of the present invention. An obtaining module 1810, a first sending module 1820, and a second sending module 1830 in the base station 1800 are basically the same as the obtaining module 1710, the first sending module 1720, and the second sending module 1730 in the base station 1700.

According to an embodiment of the present invention, the base station 1800 may further include a third sending module 1840, which may be implemented by a processor unit. The third sending module 1840 may be configured to send a handover indication to the first base station, so as to instruct the first base station to forward data to a target base station.

According to an embodiment of the present invention, the obtaining module 1810 may include a first receiving unit 1812. The first receiving unit 1812 may be configured to receive the bearer context information sent when the first base station updates the bearer context information.

According to an embodiment of the present invention, the obtaining module 1810 may include a requesting unit 1814 and a second receiving unit 1816. The requesting unit 1814 may be configured to request the bearer context information from the first base station. The second receiving unit 1816 may be configured to receive the bearer context information returned by the first base station.

According to an embodiment of the present invention, the obtaining module 1810 may include a third receiving unit 1818. The third receiving unit 1818 may be configured to receive the bearer context information sent by the first base station based on a measurement report.

The above and other operations and/or functions of the third sending module 1840, the first receiving unit 1812, the requesting unit 1814, second the receiving unit 1816, and the third receiving unit 1818 are not further described herein for avoiding repetition. For details, reference may be made to the related content in the above method 100 and method 200.

According to the base station provided by the embodiment of the present invention, a handover indication is sent to a first base station that does not know that a handover is required, so that the first base station can forward data to a target base station. In this way, the current service of a UE can be recovered quickly after the UE handover, thereby improving communication experience of a user.

Figure 19:
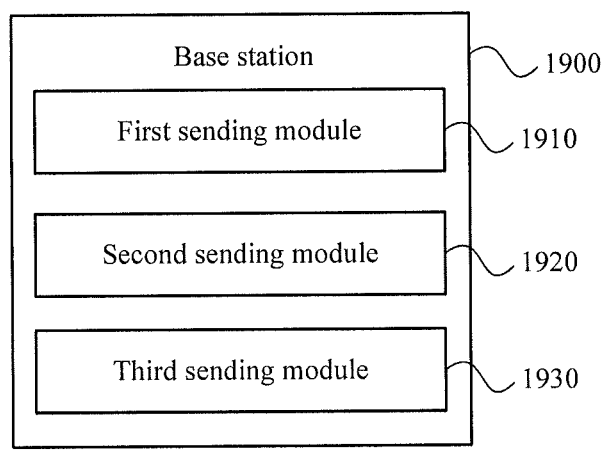
FIG. 19 is a structural block diagram of another base station according to an embodiment of the present invention.

FIG. 19 is a structural block diagram of a base station 1900 according to an embodiment of the present invention.

The base station 1900 includes a first sending module 1910, a second sending module 1920, and a third sending module 1930, which may be implemented respectively by a processor unit. The first sending module 1910 may be configured to: when a user equipment UE needs to be handed over, send a handover request to a target base station. The second sending module 1920 may be configured to: after a handover response that is returned by the target base station and indicates that the handover is agreed to is received, send a handover indication to a first base station serving the UE, so as to instruct the first base station to forward data to the target base station. The third sending module 1930 may be configured to send a handover command to the UE, so as to instruct the UE to perform handover to the target base station.

The above and other operations and/or functions of the first sending module 1910, the second sending module 1920, and the third sending module 1730 are not further described herein for avoiding repetition. For details, reference may be made to the related content in the above method 300.

According to the base station provided by the embodiment of the present invention, a handover indication is sent to a first base station that does not know that a handover is required, so as to instruct the first base station to forward UE data in the first base station to the target base station. In this way, the current service of a UE can be recovered quickly after the UE handover, thereby improving communication experience of a user.

Figure 20:
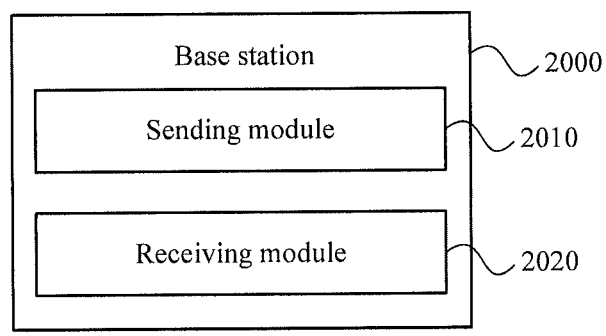
FIG. 20 is a structural block diagram of another base station according to an embodiment of the present invention.

FIG. 20 is a structural block diagram of a base station 2000 according to an embodiment of the present invention.

The base station 2000 may include a sending module 2010 and a receiving module 2020, which may be a processor unit respectively. The sending module 2010 may be configured to: when a user equipment UE needs to be handed over, send a handover request to a first base station serving the UE, so that the first base station adds bearer context information of the UE in the first base station to the handover request and forwards the handover request to a target base station, where the bearer context information is used for the target base station to determine whether to accept the UE handover. The receiving module 2020 may be configured to: after receiving a handover response sent by the first base station, which is returned by the target base station agreeing to the handover, send a handover command to the UE, so as to instruct the UE to perform handover to the target base station.

The above and other operations and/or functions of the sending module 2010 and the receiving module 2020 are not further described herein for avoiding repetition. For details, reference may be made to the related content in the above method 800.

According to the base station provided by the embodiment of the present invention, when a UE uses carrier aggregation before a handover and therefore has established a data connection with both the base station and a first base station, the base station performing the handover can hand over the UE to a target base station even if bearer context information of the UE in the first base station is not obtained. In this case, the first base station needs to add bearer context information to a received handover request, so that the target base station may determine, based on all bearer context information, whether to accept the UE handover. In this way, the UE in the carrier aggregation state can be smoothly handed over to a new base station, and the current service of the UE can be recovered quickly, thereby improving communication experience of a user.

Figure 21:
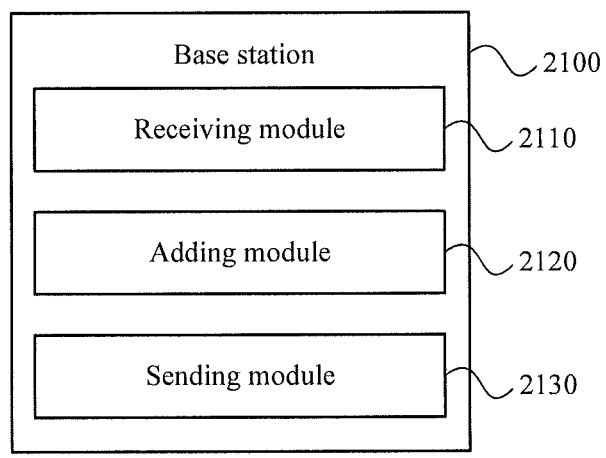
FIG. 21 is a structural block diagram of another base station according to an embodiment of the present invention.

FIG. 21 is a structural block diagram of a base station 2100 according to an embodiment of the present invention.

The base station 2100 may include a receiving module 2110, an adding module 2120, and a sending module 2130, which may be different processor units respectively. The receiving module 2110 may be configured to receive a handover request sent by a first base station for a user equipment UE that needs to be handed over. The adding module 2120 may be configured to add bearer context information of the UE in the base station to the received handover request, and send the handover request to a target base station, where the bearer context information is used for the target base station to determine whether to accept the UE handover. The sending module 2130 may be configured to send, to the first base station, a handover response that is returned by the target base station and indicates that the handover is agreed to, so as to instruct the first base station to send a handover command to the UE based on the handover response, where the handover command is used to instruct the UE to perform handover to the target base station.

The above and other operations and/or functions of the receiving module 2110, the adding module 2120, and the sending module 2130 are not further described herein for avoiding repetition. For details, reference may be made to the related content in the above method 900.

According to the base station provided by the embodiment of the present invention, when a UE uses carrier aggregation before a handover and therefore has established a data connection with both the base station and a first base station, the first base station performing the handover can hand over the UE to a target base station even if bearer context information of the UE in the base station is not obtained. In this case, the base station needs to add bearer context information to a received handover request, so that the target base station may determine, based on all bearer context information, whether to accept the handover. In this way, the UE in the carrier aggregation state can be smoothly handed over to a new base station, and the current service of the UE can be recovered quickly, thereby improving communication experience of a user.

Figure 22:
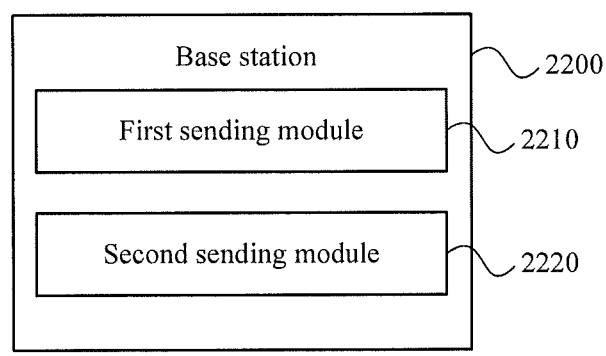
FIG. 22 is a structural block diagram of another base station according to an embodiment of the present invention.

FIG. 22 is a structural block diagram of a base station 2200 according to an embodiment of the present invention.

The base station 2200 may include a first sending module 2210 and a second sending module 2220, which may be a processor unit respectively. The first sending module 2210 may be configured to: when a user equipment UE needs to be handed over, send a handover request to a first target base station and a second target base station, where the handover request carries bearer context information of the UE and a base station identifier of the first target base station and a base station identifier of the second target base station, so that the first target base station determines, by negotiation with the second target base station based on the base station identifier of the second target base station, bearers that are related to the bearer context information and need to be undertaken respectively by the first target base station and the second target base station, where the bearer context information is used for the first target base station and the second target base station to determine whether to accept the UE handover. The second sending module 2220 may be configured to: after handover responses indicating that the handover is agreed to are received, which are returned by the first target base station and the second target base station agreeing, send a handover command to the UE, so as to instruct the UE to perform handover to the first target base station and the second target base station.

The above and other operations and/or functions of the first sending module 2210 and the second sending module 2220 are not further described herein for avoiding repetition. For details, reference may be made to the related content in the above method 1200.

According to the base station provided by the embodiment of the present invention, base station identifiers of a first target base station and a second target base station are carried in a handover request, so that the two target base stations can determine, by negotiation based on the base station identifiers, UE bearers to be undertaken. In this way, the UE can be handed over to two target base stations, and the current service of the UE can be recovered quickly, which improves communication experience of a user.

Figure 23:
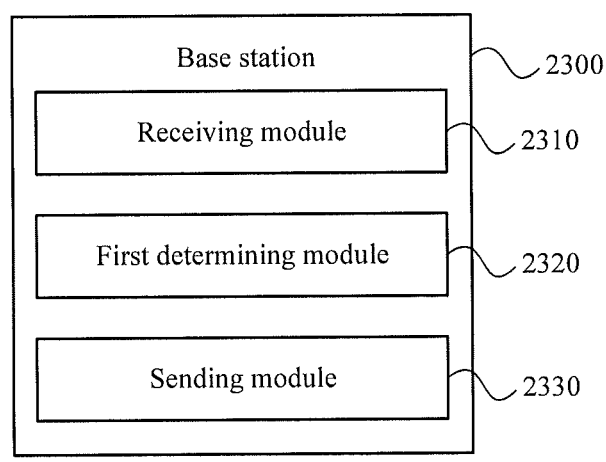
FIG. 23 is a structural block diagram of another base station according to an embodiment of the present invention.

FIG. 23 is a structural block diagram of a base station 2300 according to an embodiment of the present invention.

The base station 2300 includes a receiving module 2310, a first determining module 2320, and a sending module 2330, which may be different processor units respectively. The receiving module 2310 may be configured to receive a handover request sent by a source base station for a user equipment UE that needs to be handed over, where the handover request carries bearer context information of the UE and a base station identifier of a first target base station. The first determining module 2320 may be configured to determine, by negotiation with the first target base station based on the base station identifier of the first target base station, bearers that are related to the bearer context information and need to be undertaken respectively by the base station and the first target base station. The sending module 2330 may be configured to: when the negotiation succeeds, return a handover response to the source base station to indicate that the handover is agreed to, so that the source base station sends a handover command based on the handover response to the UE to complete the handover.

The above and other operations and/or functions of the receiving module 2310, the first receiving module 2320, and the sending module 2330 are not further described herein for avoiding repetition. For details; reference may be made to the related content in the above method 1300.

According to the base station provided by the embodiment of the present invention, the base station may determine, by negotiation with a first target base station based on a base station identifier of the first target base station, UE bearers to be undertaken. In this way, a UE can be handed over to two target base stations, and the current service of the UE can be recovered quickly, which improves communication experience of a user.

Figure 24:
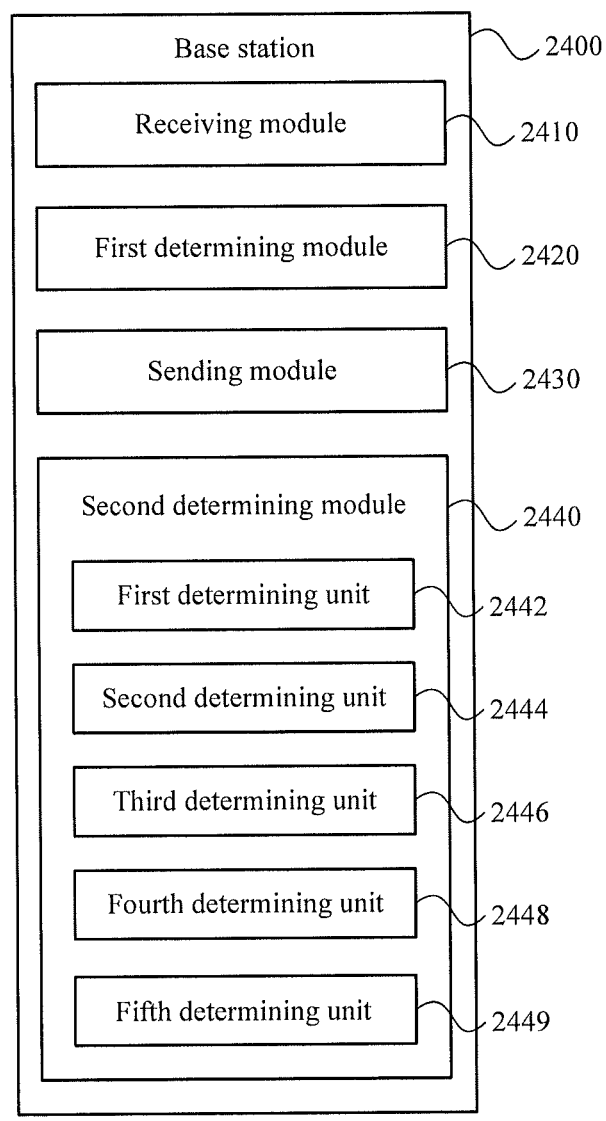
FIG. 24 is a structural block diagram of another base station according to an embodiment of the present invention.

FIG. 24 is a structural block diagram of a base station 2400 according to an embodiment of the present invention. A receiving module 2410, a first determining module 2420, and a sending module 2430 in the base station 2400 are basically the same as the receiving module 2310, the first determining module 2320, and the sending module 2330 in the base station 2300.

According to an embodiment of the present invention, the base station 2400 may include a second determining module 2440. The second determining module 2440 may be configured to determine a master station by negotiation with the first target base station based on the base station identifier of the first target base station.

According to an embodiment of the present invention, the second determining module 2440 may include one of a first determining unit 2442, a second determining unit 2444, a third determining unit 2446, a fourth determining unit 2448, and a fifth determining unit 2449. The first determining unit 2442 may be configured to determine the master station according to a sequence of receiving the handover request by the base station 2400 and the first target base station. The second determining unit 2444 may be configured to determine the master station according to a predetermined configuration. The third determining unit 2446 may be configured to determine the master station according to a sequence of establishing an RRC connection with the UE by the base station 2400 and the first target base station. The fourth determining unit 2448 may be configured to determine the master station according to a sequence of carrying the base station identifier of the first target base station and the base station identifier of the base station 2400 by the handover request. The fifth determining unit 2449 may be configured to determine the master station according to a response message returned by the first target base station in response to a request message sent by the base station 2400 for requesting to determine the master station.

The above and other operations and/or functions of the second determining module 2440, the first determining unit 2442, the second determining unit 2444, the third determining unit 2446, the fourth determining unit 2448, and the fifth determining unit 2449 are not further described herein for avoiding repetition. For details, reference may be made to the related content in the above method 1300 and method 200.

According to the base station provided by the embodiment of the present invention, the base station may determine, by negotiation with a first target base station based on a base station identifier of the first target base station carried in a handover request, a master station in multiple modes. In addition, the base station may determine, by negotiation with the first target base station, UE bearers to be undertaken. In this way, the UE can be handed over to two target base stations, and the current service of the UE can be recovered quickly, which improves communication experience of a user.

Figure 25:
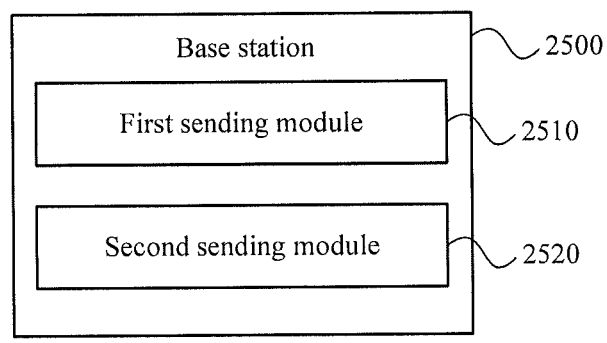
FIG. 25 is a structural block diagram of another base station according to an embodiment of the present invention.

FIG. 25 is a structural block diagram of a base station 2500 according to an embodiment of the present invention.

The base station 2500 may include a first sending module 2510 and a second sending module 2520, which may be a processor unit respectively. The first sending module 2510 may be configured to: if a user equipment UE has established an RRC connection with a first base station and a second base station respectively, when the UE needs to be handed over from the second base station to a target base station, send a handover request to the target base station, where the handover request carries a base station identifier of the first base station, so that the target base station performs interaction with the first base station based on the base station identifier of the first base station. The second sending module 2520 may be configured to: after a handover response that is returned by the target base station and indicates that the handover is agreed to is received, send a handover command to the UE, so as to instruct the UE to perform handover to the target base station.

The above and other operations and/or functions of the first sending module 2510 and the second sending module 2520 are not further described herein for avoiding repetition. For details, reference may be made to the related content in the above method 1400.

According to the base station provided by the embodiment of the present invention, when one RRC connection of a UE having two RRC connections needs to be handed over, a base station identifier of a source base station that keeps the RRC connection unchanged is carried in a handover request, so that a target base station can quickly discover the source base station and perform interaction with the source base station. In this way, the source base station and the target base station can cooperate better to serve the UE, and the impact caused by the handover to communication experience of a user is reduced.

Figure 26:
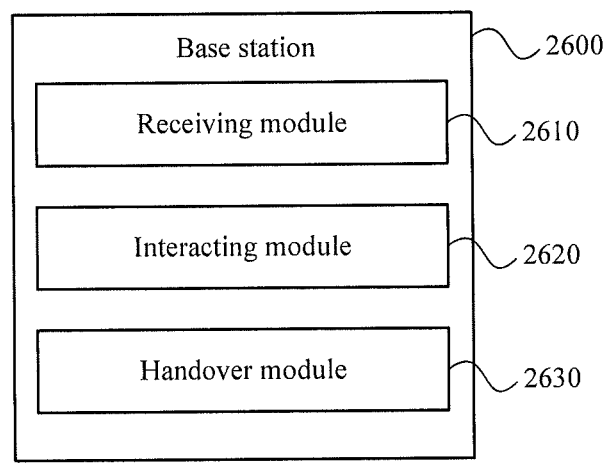
FIG. 26 is a structural block diagram of another base station according to an embodiment of the present invention.

FIG. 26 is a structural block diagram of a base station 2600 according to an embodiment of the present invention.

The base station 2600 includes a receiving module 2610, an interacting module 2620, and a handover module 2630, which may be a processor unit respectively. The receiving module 2610 may be configured to: if a user equipment UE has established an RRC connection with a first base station and a second base station respectively, when the UE needs to be handed over from the second base station to a target base station, receive a handover request sent by the second base station, where the handover request carries a base station identifier of the first base station. The interacting module 2620 may be configured to perform interaction with the first base station based on the base station identifier. The handover module 2630 may be configured to: when determining, based on the handover request, to agree to the handover, complete the UE handover with the second base station.

The above operations and/or functions of the receiving module 2610, the interacting module 2620, and the handover module 2630 are not further described herein for avoiding repetition. For details, reference may be made to the related content in the above method 1500.

According to the base station provided by the embodiment of the present invention, when one RRC connection of a UE having two RRC connections needs to be handed over, a base station identifier of a source base station that keeps the RRC connection unchanged is carried in a handover request, so that the base station can quickly discover the source base station and perform interaction with the source base station. In this way, the base station and the source base station can cooperate better to serve the UE, and the impact caused by the handover to communication experience of a user is reduced.

Persons of ordinary skill in the art may realize that the steps of the methods and units according to the embodiments disclosed in this specification may be implemented by electronic hardware, computer software, or a combination thereof. In order to specify clearly the interchangeability of the hardware and software, the steps and parts of each embodiment are described generally according to the functions in the above description. Whether these functions are executed in the form of hardware or software depends on specific applications and design constraints of the technical solutions. Persons of ordinary skill in the art may use different methods to implement the described functions for each specific application, but this implementation should not be considered as going beyond the scope of the present invention.

The steps of the method according to the embodiments disclosed in this specification can be implemented by hardware or a software program executed by a processor, or implemented by a combination thereof. The software program may be stored in a random access memory (RAM), a memory, a read-only memory (ROM), an electrically programmable ROM, an electrically erasable programmable ROM, a register, a hard disk, a removable magnetic disk, or an optical disk, or any other type of storage medium commonly known in the art.

Although some embodiments of the present invention are illustrated and described, persons skilled in that art should understand that they may make various modifications to the embodiments without departing from the principle and spirit of the present invention, and such modifications should fall within the scope of the present invention.

What is claimed is:

1. A handover method, comprising:
    when a user equipment (UE) needs to be handed over, obtaining, by a second source base station, bearer context information of the UE in a first source base station;
    sending a handover request to a target base station, wherein the handover request carries the bearer context information of the UE in the first source base station and bearer context information of the UE in the second source base station;
    determining, based on the bearer context information of the UE in the first source base station and the bearer context information of the UE in the second source base station, whether the target base station accepts a UE handover; and
    after receiving a handover response that is returned by the target base station that indicates that the handover is accepted, sending a handover command to the UE, so as to instruct the UE to perform handover to the target base station, wherein the UE is using the first source base station and the second source base station with carrier aggregation technology before the handover or the UE is using the target base station with carrier aggregation technology after the handover.

2. The method according to claim 1, further comprising:
    sending a handover indication to the first source base station to instruct the first source base station to forward data to the target base station.

3. The method according to claim 1, wherein if the first source base station has established an RRC connection with the UE, the handover request carries a base station identifier of the first source base station to indicate to the target base station that the first source base station has established an RRC connection with the UE.

4. The method according to claim 3, further comprising:
    after the UE is handed over to the target base station, indicating, by the target base station based on the base station identifier of the first source base station, the first base station to release related resources of the UE.

5. The method according to claim 1, further comprising:
    after the UE is handed over to the target base station, indicating, by the UE, the first source base station to release related resources of the UE.

6. The method according to claim 1, wherein the obtaining bearer context information of the UE in a first source base station comprises one of the following:
    receiving, as the bearer context information of the UE in the first source base station, bearer context information sent when the first source base station updates bearer context information of the UE;
    requesting bearer context information of the UE from the first source base station, and receiving, as the bearer context information of the UE in the first source base station, bearer context information returned by the first base station; and receiving, as the bearer context information of the UE in the first source base station, bearer context information of the UE sent by the first base station based on a measurement report.

7. The method according to claim 1, wherein the target base station comprises a first target base station and a second target base station, wherein the handover request carries a base station identifier of the first target base station and a base station identifier of the second target base station.

8. The method according to claim 7, further comprising:
    when the first target base station receives the handover request, determining, by the first target base station by negotiation with the second target base station based on the base station identifier of the second target base station, bearers of the UE to be undertaken respectively by the first target base station and the second target base station.

9. The method according to claim 7, further comprising:
    determining, by the first target base station, a master station by negotiation with the second target base station based on the base station identifier of the second target base station.

10. The method according to claim 9, wherein the determining, by the first target base station, a master station by negotiation with the second target base station based on the base station identifier of the second target base station comprises:
    determining, by the first target base station, the master station according to one of the following:
    a sequence of receiving the handover request by the first target base station and the second target base station;
    a predetermined configuration;
    a sequence of establishing an RRC connection with the UE by the first target base station and the second target base station;
    a sequence of carrying the base station identifier of the first target base station and the base station identifier of the second target base station by the handover request; and
    a response message returned by the second target base station in response to a request message sent by the first target base station for requesting to determine the master station.

11. A handover method, comprising:
    when a user equipment UE needs to be handed over, sending a handover request to a target base station, the handover request including information related to bearer contexts of a first source base station and a second source base station;
    after receiving a handover response that is returned by the target base station and indicates that the handover is agreed to, sending a handover indication to the first source base station which is serving the UE, so as to instruct the first source base station to forward data to the target base station; and
    sending a handover command to the UE, so as to instruct the UE to perform handover to the target base station, wherein the UE is using the first source base station and the second source base station with carrier aggregation technology before the handover or the UE is using the target base station with carrier aggregation technology after the handover.

12. The method according to claim 11, wherein if the first source base station has established an RRC connection with the UE, the handover request carries a base station identifier of the first source base station to indicate to the target base station that the first source base station has established an RRC connection with the UE.

13. The method according to claim 12, further comprising:
after the UE is handed over to the target base station, indicating, by the target base station based on the base station identifier of the first source base station, the first base station to release related resources of the UE.

14. The method according to claim 11, further comprising:
after the UE is handed over to the target base station, indicating, by the UE, the first source base station to release the related resources.

15. The method according to claim 11, wherein the target base station comprises a first target base station and a second target base station, wherein the handover request carries a base station identifier of the first target base station and a base station identifier of the second target base station.

16. The method according to claim 15, further comprising:
when the first target base station receives the handover request, determining, by the first target base station by negotiation with the second target base station based on the base station identifier of the second target base station, bearers of the UE to be undertaken respectively by the first target base station and the second target base station.

17. The method according to claim 15, further comprising:
determining, by the first target base station, a master station by negotiation with the second target base station based on the base station identifier of the second target base station.

18. A base station, comprising:
an obtaining module, configured to: when the base station is a source base station and a user equipment UE needs to be handed over, obtain bearer context information of the UE in a first source base station;
a first sending module, configured to send a handover request to a target base station, wherein the handover request carries the bearer context information of the first source base station and bearer context information of the base station, wherein the bearer context information of the first source base station and the bearer context of the base station is used for the target base station to determine whether to accept a UE handover; and
a second sending module, configured to: after a handover response that is returned by the target base station and indicates that the handover is agreed to is received, send a handover command to the UE, so as to instruct the UE to perform handover to the target base station, wherein the UE is using carrier aggregation technology before or after the handover.

19. The base station according to claim 18, further comprising:
a third sending module, configured to send a handover indication to the first source base station to instruct the first source base station to forward data to the target base station.

20. The base station according to claim 18, wherein the obtaining module comprises one of the following:
a first receiving unit, configured to receive the bearer context information sent when the first source base station updates the bearer context information;
a requesting unit, configured to request the bearer context information from the first source base station, and a second receiving unit, configured to receive the bearer context information of the first source base station; and
a third receiving unit, configured to receive the bearer context information of the first source base station based on a measurement report.

* * * * *